(12) United States Patent
Takashima

(10) Patent No.: US 8,700,917 B2
(45) Date of Patent: Apr. 15, 2014

(54) INFORMATION PROCESSING APPARATUS, INFORMATION RECORDING MEDIUM MANUFACTURING APPARATUS, AND INFORMATION RECORDING MEDIUM

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/397,143

(22) Filed: Feb. 15, 2012

(65) Prior Publication Data

US 2012/0210140 A1    Aug. 16, 2012

Related U.S. Application Data

(63) Continuation of application No. 11/814,956, filed as application No. PCT/JP2006/323275 on Nov. 22, 2006, now Pat. No. 8,190,910.

(30) Foreign Application Priority Data

Nov. 29, 2005   (JP) .................................. 2005-344699

(51) Int. Cl.
    *H04L 29/06*      (2006.01)
    *G06F 21/10*      (2013.01)
    *G06F 21/64*      (2013.01)
    *G06F 21/60*      (2013.01)

(52) U.S. Cl.
    CPC ................ *G06F 21/10* (2013.01); *G06F 21/64* (2013.01); *G06F 21/60* (2013.01)
    USPC ....................................................... 713/189

(58) Field of Classification Search
    CPC .......... G06F 21/10; G06F 21/60; G06F 21/64
    USPC .......................................................... 713/189
    See application file for complete search history.

(56) References Cited

U.S. PATENT DOCUMENTS 5,548,648 A * 8/1996 Yorke-Smith .................. 713/193
7,249,102 B1 * 7/2007 Terada et al. .................... 705/51

(Continued)

FOREIGN PATENT DOCUMENTS

EP      0 676 876 A1    10/1995
EP      1 505 596 A2    2/2005

(Continued)

OTHER PUBLICATIONS

Extended European Search Report issued Jul. 17, 2012 in Patent Application No. 06823502.7.

(Continued)

*Primary Examiner* — Michael S McNally
(74) *Attorney, Agent, or Firm* — Oblon, Spivak, McClelland, Maier & Neustadt, L.L.P.

(57) ABSTRACT

A configuration is provided for a process in which appropriate content code corresponding to apparatuses and applications of various model types and versions is selected to be performed. In a configuration in which content code recorded on an information recording medium is obtained, and processing, such as a security check in accordance with the content code, conversion of the content data, and embedding of player information into the content, is performed, at least a portion of the content code is set as encrypted data, and as an encryption key, a node key set so as to correspond to a node of a key tree having a hierarchical structure is used.

7 Claims, 21 Drawing Sheets

(56) References Cited

U.S. PATENT DOCUMENTS

| 2002/0141582 A1* | 10/2002 | Kocher et al. ............ 380/201 |
| 2004/0133794 A1 | 7/2004 | Kocher et al. |
| 2005/0066167 A1* | 3/2005 | Asano et al. ............ 713/165 |
| 2006/0227979 A1 | 10/2006 | Chen |
| 2007/0186110 A1 | 8/2007 | Takashima |
| 2008/0101604 A1 | 5/2008 | Kocher et al. |
| 2008/0133938 A1 | 6/2008 | Kocher et al. |
| 2011/0264923 A1 | 10/2011 | Kocher et al. |

FOREIGN PATENT DOCUMENTS

| JP | 05-316079 | 11/1993 |
| JP | 7 281596 | 10/1995 |
| JP | 2000 231485 | 8/2000 |
| JP | 2000-231485 | 8/2000 |
| JP | 2002-281013 | 9/2002 |
| JP | 2002 311998 | 10/2002 |
| JP | 2004-532495 | 10/2004 |
| JP | 2004 532495 | 10/2004 |
| JP | 2005-085120 | 3/2005 |
| JP | 2005 92830 | 4/2005 |
| JP | 2005 310035 | 11/2005 |
| JP | 2005-310035 | 11/2005 |

OTHER PUBLICATIONS

Keiji Horiuchi et al., "The New Method of License Key Management for Content Distribution System—Key Management for Grouping Content", 2003 Digest of Technical Papers. International Conference on Consumer Electronics (CAT. No. 03CH37416), vol. Conf. 22, No. 22 TH, XP-002904260, Jun. 17, 2003, pp. 56-57.

Japanese Office Action issued Mar. 27, 2012, in Patent Application No. 2005-344699.

U.S. Appl. No. 13/442,457, filed Apr. 9, 2012, Takashima.

Suematsu, et al., "MCMP o Riyo shita Data Hogo Hoshiki ni Kansuru Ichi Kosatsu", Information Processing Society of Japan Kenkyu Hokoku, 2000-DPS-97 2000-CSEC-8, pp. 123-129, 2000.

Japanese Office Action issued Sep. 21, 2011 in Japanese Application No. 2005-344699, 3 pages.

* cited by examiner

FIG. 11

| FIELD |
|---|
| PLAYER CERTIFICATE SIZE (PlayerCertificateSize) |
| CERTIFICATE VERSION (CertificateVersion) |
| PLAYER MANUFACTURER IDENTIFIER (ManufacturerID) |
| SERIAL NUMBER |
| SIGNATURE DATE AND TIME |
| DEVICE (PLAYER) ATTRIBUTE INFORMATION |
| PLAYER PUBLIC KEY (PlayerPublicKey) |
| DIGITAL SIGNATURE (Signature) |

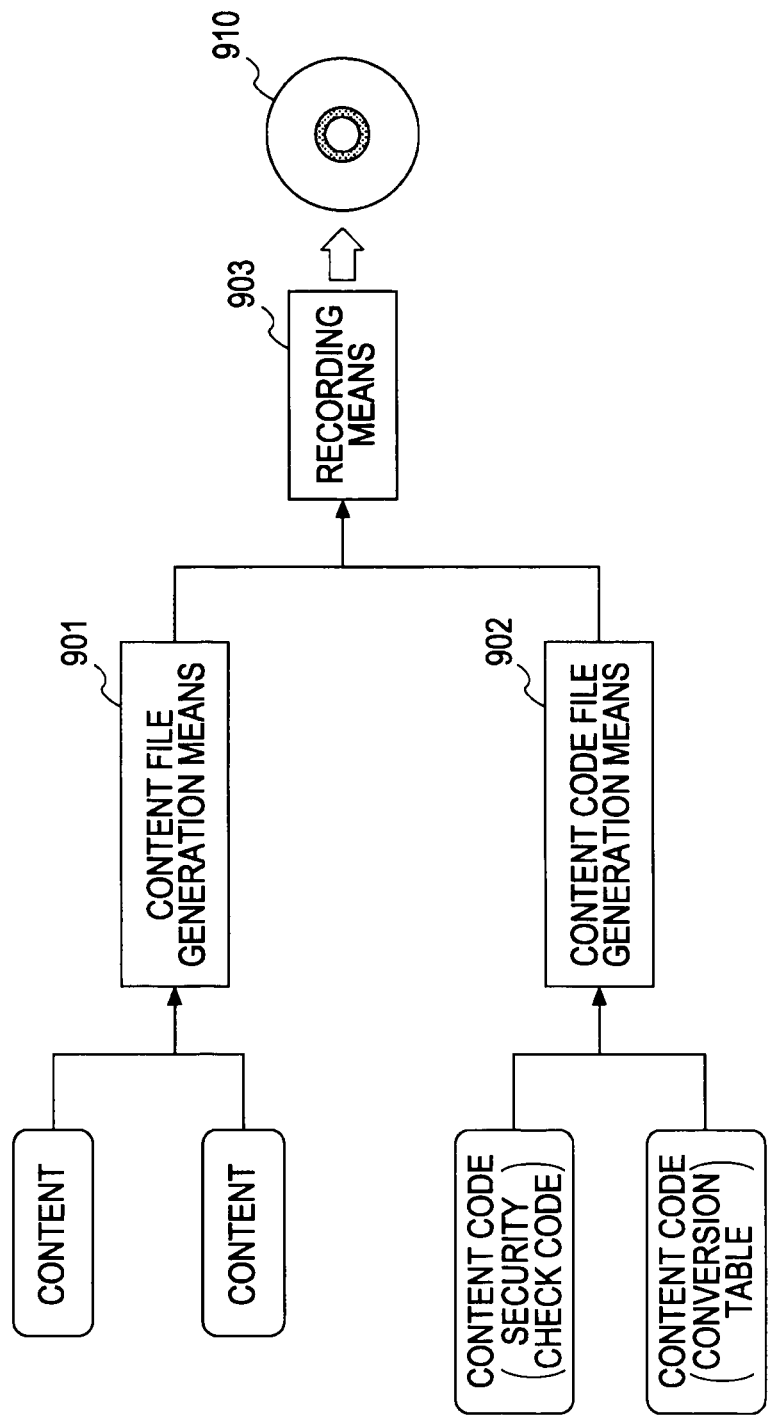

INFORMATION PROCESSING APPARATUS, INFORMATION RECORDING MEDIUM MANUFACTURING APPARATUS, AND INFORMATION RECORDING MEDIUM

CROSS-REFERENCE TO RELATED APPLICATIONS

This application is a continuation of and is based upon and claims the benefit of priority under 35 U.S.C. §120 for U.S. Ser. No. 11/814,956, filed Jul. 27, 2007, the entire contents of which is incorporated herein by reference and U.S. Ser. No. 11/814,956 which is the national stage of PCT/JP06/323275, filed Nov. 22, 2006, and claims the benefit of priority under 35 U.S.C. §119 from Japanese Patent Application No. 2005-344699, filed Nov. 29, 2005.

BACKGROUND OF THE INVENTION

1. Technical Field

The present invention relates to an information processing apparatus, an information recording medium manufacturing apparatus, an information recording medium, a method, and a computer program. More particularly, the present invention relates to an information processing apparatus configured to reliably select and execute appropriate content code compliant with players, such as information processing apparatuses and reproduction applications, when performing data processing using content code as a content-use control program, which is recorded together with content on an information recording medium, an information recording medium manufacturing apparatus, an information recording medium, a method, and a computer program.

2. Background Art

Various software data, such as audio data such as music, image data such as movies, game programs, and various kinds of application programs (hereinafter, these will be referred to as "content"), can be stored as digital data on a recording medium, for example, a Blu-ray disc (trademark) for which a blue laser is used, a DVD (Digital Versatile Disc), an MD (Mini Disc), and a CD (Compact Disc). In particular, a Blu-ray disc (trademark) for which a blue laser is used is a disc capable of being used for high-density recording and is capable of having a large amount of video content or the like recorded thereon as high-quality data.

Digital content is stored on these various information recording media and is provided to a user. The user uses a reproduction device, such as a PC (Personal Computer) or a disc player, to reproduce and use the content.

In general, sales rights or the like of most content, such as music data and image data, are held by the creator thereof or the seller thereof. Therefore, when distributing these pieces of content, it is common practice that a fixed use limitation is imposed, that is, use of content is permitted only for an authorized user so that copying without permission or the like will not be performed.

In a digital recording apparatus and a recording medium, for example, images and audio can be repeatedly recorded and reproduced without degrading them. Therefore, problems such as the following have occurred: the distribution of illegally copied content via the Internet, the distribution of so-called pirated discs produced using CD-Rs and the like, onto which content has been recorded, and wide use of copied content stored in a hard disk of a PC or the like.

It is possible for a DVD or a large-capacity recording medium, such as a recording medium using a blue laser whose development has progressed in recent years, to have a large amount of data recorded thereon for one to several movies as digital information on one medium. When it became possible to record video information and the like as digital information in the manner described above, it became increasingly important to prevent illegal copying and protect the rights of a copyright holder. In recent years, in order to prevent such illegal copying of digital data, various technologies for preventing illegal copying to digital recording apparatuses and recording media have been implemented.

As one method for protecting a copyright holder by preventing illegal copying of content, a content encryption process is known. However, even if content is encrypted, if the leakage of an encryption key occurs, a problem of illegally decrypted content being leaked can occur. In the related art, one configuration that solves such a problem as disclosed in Patent Document 1 is known. Patent Document 1 discloses a configuration in which illegal reproduction of content is prevented in such a manner that some of content is recorded by being replaced with dummy data.

When performing a process for reproducing content in which content has been replaced with dummy data, a process for replacing the dummy data with normal content data becomes necessary. This data conversion process needs to be performed without normal content being leaked to the outside. Furthermore, it is preferable that processing information, such as the position at which the dummy data is arranged and the conversion method, be prevented from being leaked.

As described above, when reproducing content, it is necessary to perform a content decryption process and a data conversion process. Furthermore, there is a case in which a security check, such as an authenticity confirmation process of confirming whether an information processing apparatus or a reproduction (player) program that is going to use content is a device or a program that has received a valid license, is performed. Such data processing is performed by executing content code recorded as a content-use control program together with content on an information recording medium. An example of a content-use process using content code is described in, for example, Patent Document 1.

Content code is set as a file independent of content and is recorded on an information recording medium. Therefore, a process for moving only content code to another information recording medium and a process for copying become possible. If leakage of content code occurs and the content code is illegally distributed and used, there is a possibility that many pieces of content can be illegally distributed and used, and great damages occur.

It is considered that, as apparatuses and applications for performing content reproduction, different apparatuses and applications of various makers are used. When a security check and a data conversion process using content code are to be performed, the following setting is preferably performed that appropriate content code compliant with players, such as different apparatuses and applications of various makers, is selected, a security check in accordance with each sequence is performed, and a unique data conversion process compliant with players is performed. In particular, in data conversion, there is a case in which player identification information is embedded into content. Thus, when correct content code compliant with a player is not selected, there is a problem in that correct player identification information is not embedded.

[Patent Document 1] Japanese Unexamined Patent Application Publication No. 2002-311998

DISCLOSURE OF INVENTION

Problems to be Solved by the Invention

The present invention has been made in view of such circumstances. It is an object of the present invention to realize a strict management configuration of content code recorded as a content-use control program together with content on an information recording medium and to provide an information processing apparatus configured to, when performing data processing using content code, reliably select and execute appropriate content code compliant with a player, such as an information processing apparatus and a reproduction application, an information recording medium manufacturing apparatus, an information recording medium, a method, and a computer program.

Means for Solving the Problems

According to a first aspect of the present invention, there is provided an information processing apparatus information processing apparatus including:

a data processor for obtaining content code containing a data processing program recorded on an information recording medium and for performing data processing in accordance with the content code; and a memory in which a node key set so as to correspond to each node in a route from a leaf as a bottommost layer node with which the information processing apparatus is associated up to an apex node in a key tree having a hierarchical structure, wherein the data processor is configured to decrypt data constituting at least a portion of the content code by using a node key obtained from the memory and to perform data processing in accordance with the content code obtained as a result of the decryption.

In an embodiment of the information processing apparatus of the present invention, the data processor is configured to obtain key specification information used to decrypt the content code and encrypted data position specification information indicating the position of encrypted data set in the content code from data stored on the information recording medium, to select a node key from the memory in accordance with the obtained information, to specify data to be decrypted in accordance with the encrypted data position specification information, and to perform a decryption process using the selected node key.

In an embodiment of the information processing apparatus of the present invention, the content code is code information encrypted data such that data constituting at least a portion of the content code is encrypted by directly using the node key, and the data processor is configured to perform a process for decrypting the code information encrypted data by using the node key obtained from the memory.

In an embodiment of the information processing apparatus of the present invention, the content code contains code information encrypted data such that at least a portion of the content code is encrypted using a unique encryption key differing from the node key and encrypted key data such that the unique encryption key is encrypted using the node key, and the data processor is configured to perform a process for obtaining a unique encryption key by decrypting the encrypted key data by using the node key obtained from the memory and for decrypting the code information encrypted data by using the unique encryption key.

In an embodiment of the information processing apparatus of the present invention, the content code contains security check code corresponding to the information processing apparatus, and the data processor is configured to perform a security check process on the basis of the content code decrypted using the node key.

In an embodiment of the information processing apparatus of the present invention, the content code contains data generation process code used for a process for converting data constituting content stored on the information recording medium, and the data processor is configured to generate data used for a process for converting the data constituting content stored on the information recording medium on the basis of the content code that is decrypted using the node key.

In an embodiment of the information processing apparatus of the present invention, the content code contains data generation process code used for a data conversion process for embedding identification information corresponding to the information processing apparatus or the content using application into a portion of the data constituting content stored on the information recording medium, and the data processor is configured to generate data used for a data conversion process for embedding identification information on the basis of the content code that is decrypted using the node key.

In an embodiment of the information processing apparatus of the present invention, the data processor is configured to perform a process for obtaining a player certificate stored in the memory of the information processing apparatus, for performing an authenticity verification process for the player certificate, for obtaining identification information corresponding to the information processing apparatus or the content using application from the recorded information of the player certificate under the condition that the authenticity has been confirmed, and for selecting content code to be processed in accordance with the obtained information.

According to a second aspect of the present invention, there is provided an information recording medium manufacturing apparatus including:

content file generation means for generating a content file having stored therein content data to be recorded on an information recording medium;

content code file generation means for generating a content code file having stored therein content code containing a data processing program to be executed when using content; and recording means for recording the content file generated by the content file generation means and the content code file generated by the content code file generation means on the information recording medium, wherein the content code file generation means is configured to generate a content code file having stored therein content code containing encrypted data that is encrypted using a node key corresponding to one of nodes in a key tree having a hierarchical structure in which each of a plurality of information processing apparatuses or each of a plurality of reproduction applications is associated with a leaf that is a bottommost layer node.

In an embodiment of the information recording medium manufacturing apparatus of the present invention, the content code file generation means is configured to generate a content code file having stored therein content code containing code information encrypted data such that data constituting the content code is encrypted by directly using the node key.

In an embodiment of the information recording medium manufacturing apparatus of the present invention, the content code file generation means is configured to generate a content code file having stored therein content code containing code information encrypted data such that data constituting the content code is encrypted using a unique encryption key differing from the node key and encrypted key data such that the unique encryption key is encrypted using the node key.

In an embodiment of the information recording medium manufacturing apparatus of the present invention, the content code file generation means is configured to generate a content code file having stored therein content code containing at least one of security check code corresponding to the information processing apparatus and data generation process code applied in a process for converting data constituting content stored on the information recording medium.

In an embodiment of the information recording medium manufacturing apparatus of the present invention, the content code file generation means is configured to generate a content code file having stored therein content code containing data generation process code applied in a data conversion process for embedding identification information corresponding to the information processing apparatus or the content using application into a portion of the data constituting content stored on the information recording medium.

According to a third aspect of the present invention, there is provided an information recording medium including, as stored data:

a content file having stored therein content data; and a content code file having stored therein content code containing a data processing program to be executed when using content, wherein the content code file includes a content code file having stored therein content code containing encrypted data that is encrypted using a node key corresponding to one of nodes in a key tree having a hierarchical structure in which each of a plurality of information processing apparatuses or each of a plurality of reproduction applications is associated with a leaf that is a bottommost layer node.

In an embodiment of the information recording medium of the present invention, the content code file is a content code file having stored therein content code containing code information encrypted data such that data constituting the content code is encrypted by directly using the node key.

In an embodiment of the information recording medium of the present invention, the content code file is a content code file having stored therein content code containing code information encrypted data such that data constituting the content code is encrypted using a unique encryption key differing from the node key and encrypted key data such that the unique encryption key is encrypted using the node key.

In an embodiment of the information recording medium of the present invention, the content code file is a content code file having stored therein content code containing one of security check code corresponding to the information processing apparatus and data generation process code applied in a process for converting data constituting content stored on the information recording medium.

In an embodiment of the information recording medium of the present invention, the content code file is a content code file having stored therein content code containing data generation process code used for a data conversion process for embedding identification information corresponding to the information processing apparatus or the content using application into a portion of the data constituting content stored on the information recording medium.

According to a fourth aspect of the present invention, there is provided an information processing method for use with an information processing apparatus, for performing data processing using data recorded on an information recording medium, the information processing method including:

a content code obtaining step of obtaining content code containing a data processing program recorded on the information recording medium;

a node key selection step of selecting a node key from a memory in which a node key set so as to correspond to each node in a route from a leaf as a bottommost layer node with which the information processing apparatus is associated up to an apex node in a key tree having a hierarchical structure is stored;

a code decryption step of decrypting data constituting at least a portion of the content code by using the node key selected in the node key selection step; and a data processing step of performing data processing in accordance with the content code decrypted in the code decryption step.

In an embodiment of the information processing method of the present invention, the node key selection step is a step of obtaining key specification information used to decrypt the content code from the data stored on the information recording medium and selecting a node key from the memory in accordance with the obtained information, and the code decryption step is a step of obtaining encrypted data position specification information indicating the position of encrypted data set in the content code from the data stored on the information recording medium, specifying data to be decrypted in accordance with the obtained information, and performing a decryption process using the selected node key.

In an embodiment of the information processing method of the present invention, the content code is code information encrypted data such that data constituting at least a portion of the content code is encrypted by directly using the node key, and the code decryption step is a step of performing a process for decrypting the code information encrypted data by using the node key obtained from the memory.

In an embodiment of the information processing method of the present invention, the content code includes code information encrypted data such that data constituting at least a portion of the content code is encrypted using a unique encryption key differing from the node key and encrypted key data such that the unique encryption key is encrypted using the node key, and the code decryption step is a step of obtaining a unique encryption key by decrypting the encrypted key data by using the node key obtained from the memory and performing a process for decrypting the code information encrypted data by using the unique encryption key.

In an embodiment of the information processing method of the present invention, the content code contains security check code corresponding to the information processing apparatus, and the data processing step is a step of performing a security check process on the basis of the content code that is decrypted using the node key.

In an embodiment of the information processing method of the present invention, the content code includes data generation process code used for a process for converting data constituting content stored on the information recording medium, and the data processing step is a step of generating data used for a process for converting the data constituting content to be stored on the information recording medium on the basis of the content code that is decrypted using the node key.

In an embodiment of the information processing method of the present invention, the content code includes data generation process code to be used for a data conversion process for embedding identification information corresponding to an information processing apparatus or a content using application into a portion of the data constituting content stored on the information recording medium, and the data processing step is a step of generating data to be used for a data conversion process for embedding identification information on the basis of the content code that is decrypted using the node key.

In an embodiment of the information processing method of the present invention, the information processing method further includes a step of obtaining a player certificate stored in a memory of the information processing apparatus, performing a process for verifying the authenticity of the player certificate, obtaining identification information corresponding to the information processing apparatus or the content using application from the information recorded in the player certificate, and selecting content code to be processed in accordance with the obtained information.

According to a fifth aspect of the present invention, there is provided an information recording medium manufacturing method for use with an information recording medium manufacturing apparatus, the information recording medium manufacturing method including:

a content file generation step of generating a content file having stored therein content data to be recorded on an information recording medium;

a content code file generation step of generating a content code file having stored therein content code containing a data processing program to be executed when using content; and a recording step of recording a content file generated in the content file generation step and a content code file generated in the content code file generation step on the information recording medium, wherein the content code file generation step is a step of generating a content code file having stored therein content code containing encrypted data that is encrypted using a node key corresponding to one of nodes in a key tree having a hierarchical structure in which each information processing apparatus or each reproduction application is associated with a leaf that is a bottommost layer node.

In an embodiment of the information recording medium manufacturing method of the present invention, the content code file generation step is a step of generating a content code file having stored therein content code containing code information encrypted data such that data constituting the content code is encrypted by directly using a node key.

In an embodiment of the information recording medium manufacturing method of the present invention, the content code file generation step is a step of generating a content code file having stored therein content code containing code information encrypted data such that data constituting the content code is encrypted using a unique encryption key differing from the node key and encrypted key data such that the unique encryption key is encrypted using the node key.

In an embodiment of the information recording medium manufacturing method of the present invention, the content code file generation step is a step of generating a content code file having stored therein content code containing at least one of security check code corresponding to the information processing apparatus and data generation process code to be used for a process for converting data constituting content stored on the information recording medium.

In an embodiment of the information recording medium manufacturing method of the present invention, the content code file generation step is a step of generating a content code file having stored therein content code containing data generation process code to be used for a data conversion process for embedding identification information corresponding to the information processing apparatus or the content using application into a portion of the data constituting content stored on the information recording medium.

According to a sixth aspect of the present invention, there is provided a computer program for enabling an information processing apparatus to perform data processing using data recorded on an information recording medium, the computer program including:

a content code obtaining step of obtaining content code containing a data processing program recorded on the information recording medium;

a node key selection step of selecting a node key from a memory in which a node key set so as to correspond to each node in a route from a leaf as a bottommost layer node with which an information processing apparatus is associated up to an apex node in a key tree having a hierarchical structure is stored;

a code decryption step of decrypting data constituting at least a portion of the content code by using the node key selected in the node key selection step; and a data processing step of performing data processing in accordance with the content code decrypted in the code decryption step.

The computer program of the present invention is, for example, a computer program that can be provided to a computer system capable of executing various program codes by means of a storage medium or a communication medium for providing the program codes in a computer-readable format, for example, a recording medium such as a CD, an FD, or an MO, or a communication medium such as a network. As a result of providing such a program in a computer-readable format, processing corresponding to the program is realized in the computer system.

Other further objects, features, and advantages of the present invention will become apparent from the more detailed description based on the embodiments of the present invention as will be given later and the attached drawings. In this specification, the system designates a logical assembly of a plurality of devices. It is not essential that the devices be disposed in the same housing.

Advantages

According to the configuration of an embodiment of the present invention, in a configuration in which content code containing a data processing program, which is recorded on an information recording medium, is obtained, and data processing, such as a security check process in accordance with the content code, a process for converting data constituting the content, and a process for embedding player information into the content, is performed, at least some of the content code is set as encrypted data, and as an encryption key therefor, a node key set in such a manner as to correspond to a node of a key tree having a hierarchical structure is used. It is possible to specify in advance a player capable of decrypting an encrypted part of the content code by using a node key, and it is possible to process only appropriate content code compliant with each player, thereby realizing a configuration in which a process for using invalid content code is prevented.

BRIEF DESCRIPTION OF THE DRAWINGS

FIG. 11 illustrates an example of the data structure of a player certificate.

FIG. 21 is a block diagram illustrating the configuration of an information recording medium manufacturing apparatus.

BEST MODE FOR CARRYING OUT THE INVENTION

Figure 1:
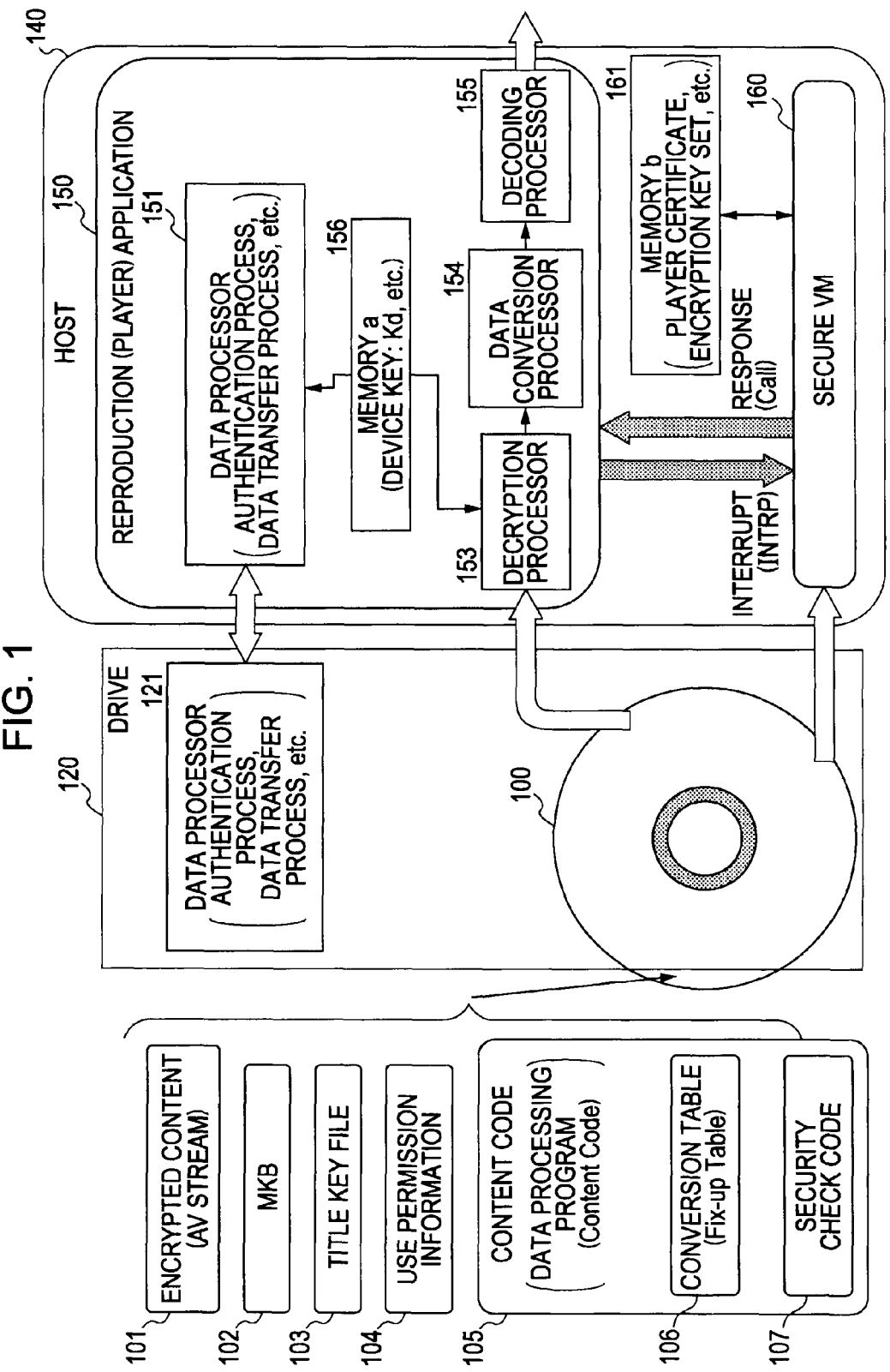
FIG. 1 illustrates data stored on an information recording medium, a drive apparatus, and the configuration and processing of an information processing apparatus.

A description will be given below, with reference to the drawings, of the details of an information processing apparatus, an information recording medium manufacturing apparatus, an information recording medium, a method, and a computer program according to the present invention. The description is given in accordance with the following described items.

1. Data stored on information recording medium, and overview of processing performed in drive and host
2. Content management unit (CPS unit)
3. Data structure of content containing modified data and overview of data conversion process
4. Content reproduction process
5. Processing in which security check code is used
6. Encryption key distribution configuration for information processing apparatus, content code encryption, and use process configuration
7. Configuration of information processing apparatus
8. Information recording medium manufacturing apparatus and information recording medium

[1. Data Stored on Information Recording Medium, and Overview of Processing Performed in Drive and Host]

A description will be given first of data stored on an information recording medium, and the overview of processing performed in a drive and a host. FIG. 1 shows the configuration of an information recording medium 100 on which content is stored, a drive 120, and a host 140. The host 140 is, for example, a data reproduction (or recording) application to be executed by an information processing apparatus such as a PC, and performs processing using the hardware of an information processing apparatus such as a PC in accordance with a predetermined data processing sequence.

The information recording medium 100 is, for example, an information recording medium, such as a Blu-ray disc (trademark) or a DVD, and is an information recording medium (ROM disc, etc.) on which valid content is stored, which is manufactured in a disc manufacturing factory with the permission of a so-called content right holder having an authorized content copyright or sales right, or a data writable information recording medium (RE disc, etc.). In the following embodiment, a description will be given using a disc-type medium as an example of an information recording medium. Alternatively, the present invention can be applied to a configuration in which information recording media of various formats are used.

As shown in FIG. 1, on the information recording medium 100, the following are stored: encrypted content 101 on which an encryption process has been performed and a process for replacing some of the data has been performed; an MKB (media key block) 102 as an encrypted key block that is generated on the basis of a tree-structure key distribution system, which is known as one type of broadcast encryption method; a title key file 103 constituted by data (Encrypted CPS Unit Key) such that a title key used for a content decryption process is encrypted, and the like; use permission information 104 containing CCI (Copy Control Information) as copy/play control information of content, and the like; and content code 105 containing a data processing program to be executed when the encrypted content 101 is used.

The content code 105 contains a conversion table (Fix-up Table) 106 in which conversion data corresponding to the replacement data in a predetermined area within the content is registered, and furthermore contains security check code 107 constituted by a program for verifying the authenticity of a player (reproduction apparatus) for performing content reproduction.

First, the information processing apparatus for reproducing content performs a process for verifying the authenticity of a player (reproduction apparatus) in accordance with security check code 107 contained in the content code 105. After the verification process, the information processing apparatus performs processes for fetching conversion data recorded in the conversion table (Fix-up Table) 106 contained in the content code 105 and for replacing data constituting the content in accordance with a data conversion process program contained in the content code 105.

The conversion table (Fix-up Table) 106 and the security check code 107 contain various kinds of codes so that processing corresponding to various types of reproduction apparatuses and reproduction applications, that is, a security check process and a conversion process, can be performed. Examples thereof include security check code and a conversion table corresponding to a player produced by Company A, and security check code and a conversion table corresponding to a player produced by Company B. A player that is going to use content selects security check code and a conversion table corresponding thereto from the security check codes and the conversion tables, and performs processing.

As described above, the content code 105 contains, in addition to a conversion process program using conversion data, information and a program for executing various processes such as a start-up process and a security check process. The details of the content code will be described later in detail. The data stored on the information recording medium is an example, and the stored data can slightly differ according to the type of disc or the like. A description will now be given of the overview of these various kinds of information.

(1) Encrypted Content 101

On the information recording medium 100, various pieces of content are stored. Examples thereof include content constituted by an AV (Audio Visual) stream of moving image content such as HD (High Definition) movie content, which is high-definition moving image data, a game program defined by a specific standard, an image file, audio data, text data, and the like. These pieces of content are specific AV format standard data, and is stored in accordance with a specific AV data format. More specifically, the content is stored as, for example, Blu-ray disc (trademark) ROM standard data in accordance with the Blu-ray Disc (trademark) ROM standard format.

Furthermore, there is a case in which, for example, a game program as service data, an image file, audio data, text data, and the like are stored. There is also a case in which the content is stored as data having a data format that is not compliant with a specific AV data format.

Examples of types of content include various content, such as music data, image data such as a moving image and a still image, a game program, and WEB content. These pieces of content include information in various formats, such as content information that can be used only in combination with the data from the information recording medium 100, and content information that can be used in combination with data from the information recording medium 100 and data that is provided from a server connected via a network. Content to be stored on an information recording medium is stored in such a manner that, in order to realize use control different for each divisional content, a key (CPS unit key or unit key (or sometimes also referred to as a title key) different for each divisional content is assigned and is encrypted. The unit for which one unit key is assigned is referred to as a content management unit (CPS unit). Some of the data constituting the content is set as broken data that has been replaced with data differing from correct content data. Correct content reproduction cannot be performed with only a decryption process. When reproduction is to be performed, a process for replacing the broken data with data registered in the content becomes necessary. These processes will be described in detail later.

(2) MKB

The MKB (Media Key Block) 102 is an encrypted key block that is generated on the basis of a tree-structure key distribution system, which is known as one type of broadcast encryption method. The MKB 102 is a key information block in which a media key [Km] that is a key necessary for decrypting content can be obtained by only the process (decryption) based on a device key [Kd] stored in an information processing apparatus of a user having a valid license. This is such that an information distribution method in accordance with a so-called hierarchical tree structure is applied so that a media key [Km] can be obtained only when a user device (information processing apparatus) has a valid license, and the media key [Km] cannot be obtained in a user device that has been nullified (revoked).

A management center as a licensing entity can generate an MKB having a configuration in which decryption is not possible using a device key stored in a specific user device as a result of the device key used to encrypt key information to be stored in the MKB being changed, that is, a media key necessary for decrypting the content cannot be obtained. Therefore, it is possible to provide encrypted content that can be decrypted, to only a device having a valid license by nullifying (revoking) an unauthorized device at any timing. The content decryption process will be described later.

(3) Title Key File

As described above, each piece of content or a collection of a plurality of pieces of content is subjected to encryption using an individual encryption key (title key (CPS unit key)) and is stored on the information recording medium 100 for the purpose of content use management. That is, an AV (Audio Visual) stream, music data, image data such as a moving image and a still image, a game program, WEB content and the like constituting content are divided into units as content use management units, and it is necessary to generate a different title key for each unit and necessary to perform a decryption process. Information for generating this title key is title key data, and the title key is obtained by decrypting the encrypted title key using the key generated using, for example, a media key. A title key corresponding to each unit is generated in accordance with a predetermined encryption key generation sequence, and the content is decrypted.

(4) Use Permission Information

Use permission information contains, for example, copy/play control information (CCI). Examples thereof include copy limitation information and reproduction limitation information for the purpose of controlling use corresponding to the encrypted content 101 stored on the information recording medium 100. Various setting are possible for the copy/play control information (CCI), for example, the copy/play control information may be set as information for individual CPS units set as content management units or the copy/play control information may be set in such a manner as to correspond to a plurality of CPS units.

(5) Content Code

The content code 105 contains a conversion table (Fix-up Table) 106 in which conversion data corresponding to replacement data in a predetermined area within the content is registered, and the security check code 107 that is a program for verifying the authenticity of a player (reproduction apparatus) for performing content reproduction.

As described above, the conversion table and the security check code contain various kinds of codes so that processing according to the types of players as various reproduction apparatuses is possible. The player that is going to use content selects the security check code and the conversion table corresponding thereto and performs a security check process and a data conversion process.

A host as a reproduction application of the reproduction apparatus for reproducing content sets a virtual machine (VM) for performing a data conversion process. In the virtual machine (VM), the security check process and the data conversion process are performed in accordance with content code read from the information recording medium 100, and a process for converting data constituting some of the content is performed by using entries registered in the conversion table (Fix-up Table) 106.

Predetermined encryption has been performed on the encrypted content 101 stored on the information recording medium 100, and some data constituting the content is constituted by broken data differing from correct data. When reproducing content, a data overwriting process for replacing the broken data with conversion data, which is correct content data, is necessary. The table in which the conversion data is registered is the conversion table (Fix-up Table) 106. Many pieces of broken data are set in a scattered manner within the content, and when reproducing the content, a process for replacing (overwriting) the plurality of pieces of broken data with the conversion data registered in the conversion table is necessary. As a result of using the conversion data, even when, for example, an encryption key is leaked and the content is illegally decrypted, with only the decryption of the content, it is not possible to correctly reproduce content due to the presence of the replaced data, making it possible to prevent unauthorized content use.

The conversion table 106 contains, in addition to normal conversion data, conversion data (Forensic Mark) containing data by which bits constituting identification information that enables a content reproduction apparatus or a content reproduction application to be identified can be analyzed. More specifically, for example, "conversion data (Forensic Mark) containing an identification mark" is contained in which player ID as identification data for the player (apparatus for performing a host application) or identification information generated on the basis of the player ID is recorded. The conversion data containing the identification mark is data in which the bit values of the correct content data are slightly changed at a level that does not influence the reproduction.

The content code 105 contains, in addition to the data conversion process program using the above-described conversion table 106, information and programs used to perform various processes, such as a start-up process and a security check process. The details of the content code will be described in detail later.

Next, a description will be given, with reference to FIG. 1, of the configuration of a host 140 and a drive 120 and the overview of processing performed thereby. A process for reproducing content stored on the information recording medium 100 is performed when data is transferred to the host 140 via the drive 120.

In the host 140, a reproduction (player) application 150 and a secure VM 160 are set. The reproduction (player) application 150 is a content reproduction processor and performs processing, such as an authentication process with the drive, content decryption, and a decoding process, which are performed in the content reproduction process.

The secure VM 160 performs a process using the content code 105. The content code 105 contains the conversion table 106 and the security check code 107. The secure VM 160 selects the security check code 107 compliant with its own player, performs a security check process, and performs a process for replacing some data of the content using the conversion table 106. The secure VM 160 is set as a virtual machine inside the host 140. The virtual machine (VM) is a virtual computer for directly interpreting an intermediate language, and reads command code information in an intermediate language independent of a platform from the information recording medium 100, interprets it, and executes it.

The secure VM 160 functions as a data processor for obtaining the content code 105 containing a program or application information applied to use the encrypted content 101 recorded on the information recording medium 100 and for performing data processing in accordance with the obtained content code 105.

The secure VM 160 obtains player information from a memory b-161 that is an accessible memory of a secure VM, selects content code corresponding to the player information from the information recording medium, and executes it. Some of the content code is set as encrypted data, and an encryption key (node key) for decrypting the encrypted data is stored in the memory b-161. The secure VM 160 performs a process for decrypting the content code by using the key selected from the memory b-161.

In the memory b-161, an encryption key set containing node keys that are set in such a manner as to each correspond to a node in the route from a leaf as a bottommost layer node with which the information processing apparatus is associated up to an apex node in a key tree having a hierarchical structure. The secure VM 160 performs a process for decrypting the content code by selecting a node key from the memory b-161 in accordance with key specification information corresponding to the content code and by using the selected key. The details of the encryption key set stored in the memory b-161 and the details of the process to be performed by the secure VM 160 will be described later.

Information transmission or processing request between the reproduction (player) application 150 and the secure VM 160 is performed on the basis of a sequence of an interrupt (INTRP) from the reproduction (player) application 150 to the secure VM 160 and a response (Call) process from the secure VM 160 to the reproduction (player) application 150. It is performed on the basis of a sequence of an interrupt (INTRP) from the application 150 to the secure VM 160 and a response (Call) process from the secure VM 160 to the reproduction (player) application 150.

Main processing to be performed by the host 140 will now be described. Prior to using content, a mutual authentication process is performed between the drive 120 and the host 140, and their authenticity is confirmed by the authentication process producing a positive result. Thereafter, the encrypted content is transferred from the drive to the host. On the host side, a process for decrypting the content is performed, a data conversion process is performed using the above-described conversion table, and the content is reproduced.

The data processor 121 of the drive 120 performs an authentication process with the host, which is performed when content is used, processes for reading data from the information recording medium and for transferring data to the host, and other processes.

The reproduction (player) application 150 of the host 140 is, for example, a data reproduction (or recording) application executed by the information processing apparatus such as a PC, and performs processing using the hardware of the information processing apparatus such as a PC in accordance with a predetermined data processing sequence.

The host 140 includes a data processor 151 for performing a mutual authentication process with the drive 120, data transfer control, and the like, a decryption processor 153 for performing a process for decrypting encrypted content, a data conversion processor 154 for performing a data conversion process on the basis of the data registered in the conversion table 105, and a decoding processor 155 for performing a decoding (for example, MPEG decoding) process.

The decryption processor 153 generates a key used to decrypt the content by using various kinds of information stored in a memory a156 and data read from the information recording medium 100, and performs a process for decrypting the encrypted content 101. In accordance with the data conversion process program obtained from the information recording medium 100, the data conversion processor 154 performs a process for replacing (overwriting) data constituting the content by using the conversion data registered in the conversion table obtained from the information recording medium 100. The decoding processor 155 performs a decoding (for example, MPEG decoding) process.

In the memory a156 of the information processing apparatus 150, a device key: Kd, key information used for a mutual authentication process, key information used for decryption, and the like are stored. The details of the content decryption process will be described later. The device key: Kd is a key used for the MKB process described earlier. The MKB is a key information block in which a media key [Km] that is a key necessary for decrypting content can be obtained by only the process (decryption) based on the device key [Kd] stored in the information processing apparatus of a user having a valid license. When decrypting encrypted content, the information processing apparatus 150 performs the MKB process by using the device key: Kd stored in the memory a156. The details of the content decryption process will be described later.

[2. Content Management Unit (CPS Unit)]

As described above, content to be stored on an information recording medium is stored in such a manner that a key different for each unit is assigned and an encryption process is performed for the purpose of realizing use control different for each unit. That is, the content is divided into content management units (CPS units), an encryption process is performed individually, and use management is performed individually.

When using content, first, it is necessary to obtain a CPS unit key (also called a title key) assigned to each unit. Furthermore, reproduction is performed by performing data processing based on a predetermined decryption processing sequence by using other necessary keys, key generation information, and the like. The mode of setting content management units (CPS units) will be described below with reference to FIG. 2.

Figure 2:
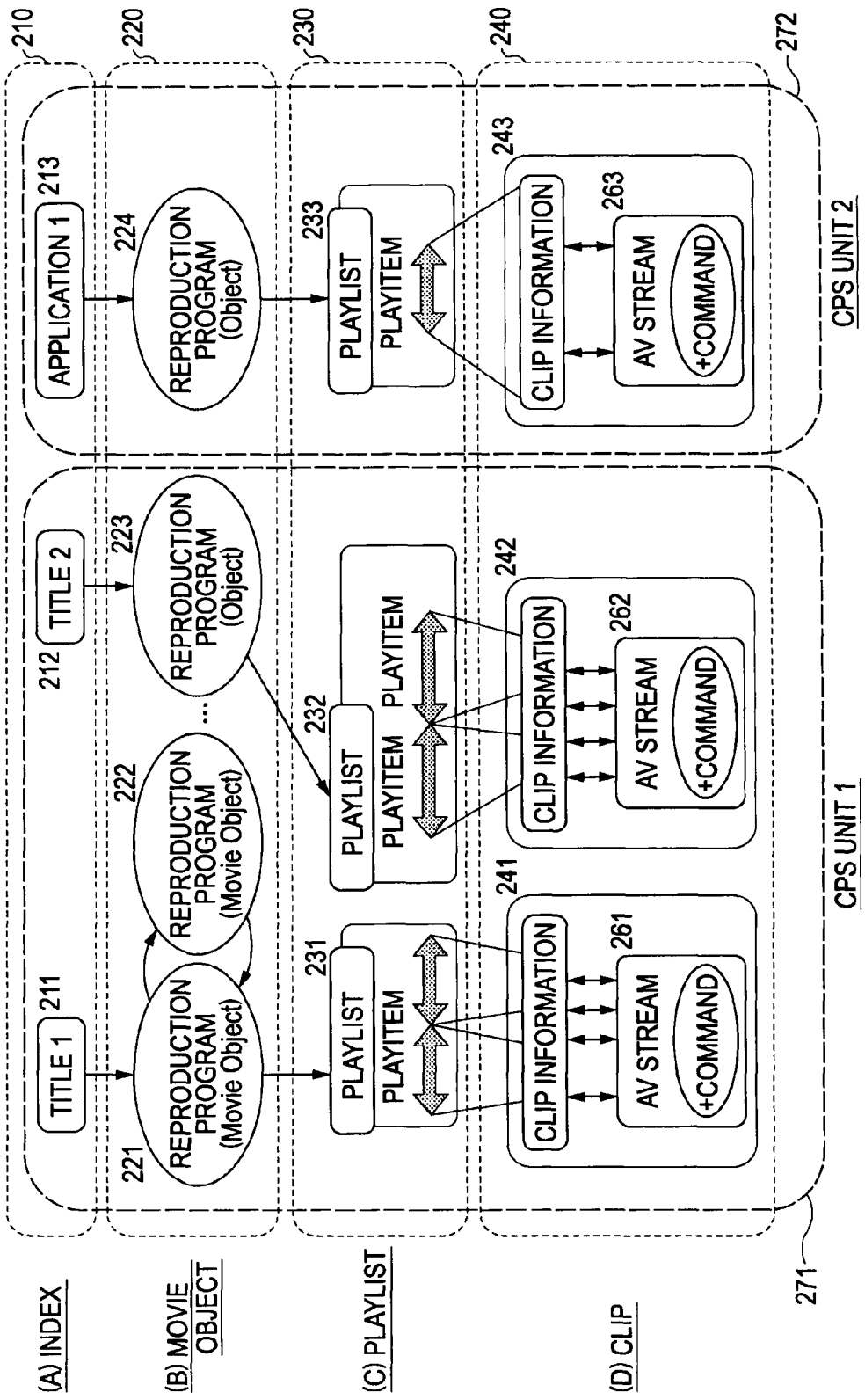
FIG. 2 illustrates an example of setting content management units that are set in the data stored on the information recording medium.

As shown in FIG. 2, the content has a hierarchical structure of (a) indexes 210, (b) movie objects 220, (c) playlists 230, and (D) clips 240. When an index, such as a title to be accessed by a reproduction application, is specified, a reproduction program associated with, for example, a title is specified, and a playlist in which the reproduction sequence of the content and the like are defined in accordance with the program information of the specified reproduction program is selected.

The playlist contains playitems as data information to be reproduced. On the basis of clip information as a reproduction segment defined by the playitem contained in the playlist, an AV stream as actual content data or a command is selectively read, and processes for reproducing the AV stream and for executing the command are performed. Many pieces of playlists and playitems exist, and playlist IDs and playitem IDs as identification information are associated with them correspondingly.

FIG. 2 shows two CPS units. These constitute some of the content stored on the information recording medium. Each of a CPS unit 1-271 and a CPS unit 2-272 is a CPS unit set as a unit containing a clip containing a title as an index, a movie object as a reproduction program file, a playlist, and an AV stream file as actual content data.

The content management unit (CPS unit) 1-271 contains a title 1-211, a title 2-212, reproduction programs 221 and 222, playlists 231 and 232, a clip 241, and a clip 242. AV stream data files 261 and 262 that are actual content data contained in the two clips 241 and 242 are at least data to be encrypted, and are, in principle, set as data encrypted by using a title key (Kt1) (also called a CPS unit key) that is an encryption key set in such a manner as to be associated with the content management unit (CPS unit) 1-271.

The content management unit (CPS unit) 2-272 contains an application 1-213 as an index, a reproduction program 224, a playlist 233, and a clip 243. An AV stream data file 263 that is actual content data contained in the clip 243 is encrypted using a title key (Kt2) that is an encryption key set in such a manner as to be associated with the content management unit (CPS unit) 2-272.

For example, in order for the user to execute an application file or a content reproduction process corresponding to the content management units 1-271, it is necessary to obtain the title key: Kt1 as an encryption key set in such a manner as to be associated with the content management unit (CPS unit) 1-271 and necessary to perform a decryption process. In order to execute an application file or a content reproduction process corresponding to the content management unit 2-272, it is necessary to obtain the title key: Kt2 as an encryption key set in such a manner as to be associated with the content management unit (CPS unit) 2-272 and necessary to perform a decryption process.

Figure 3:
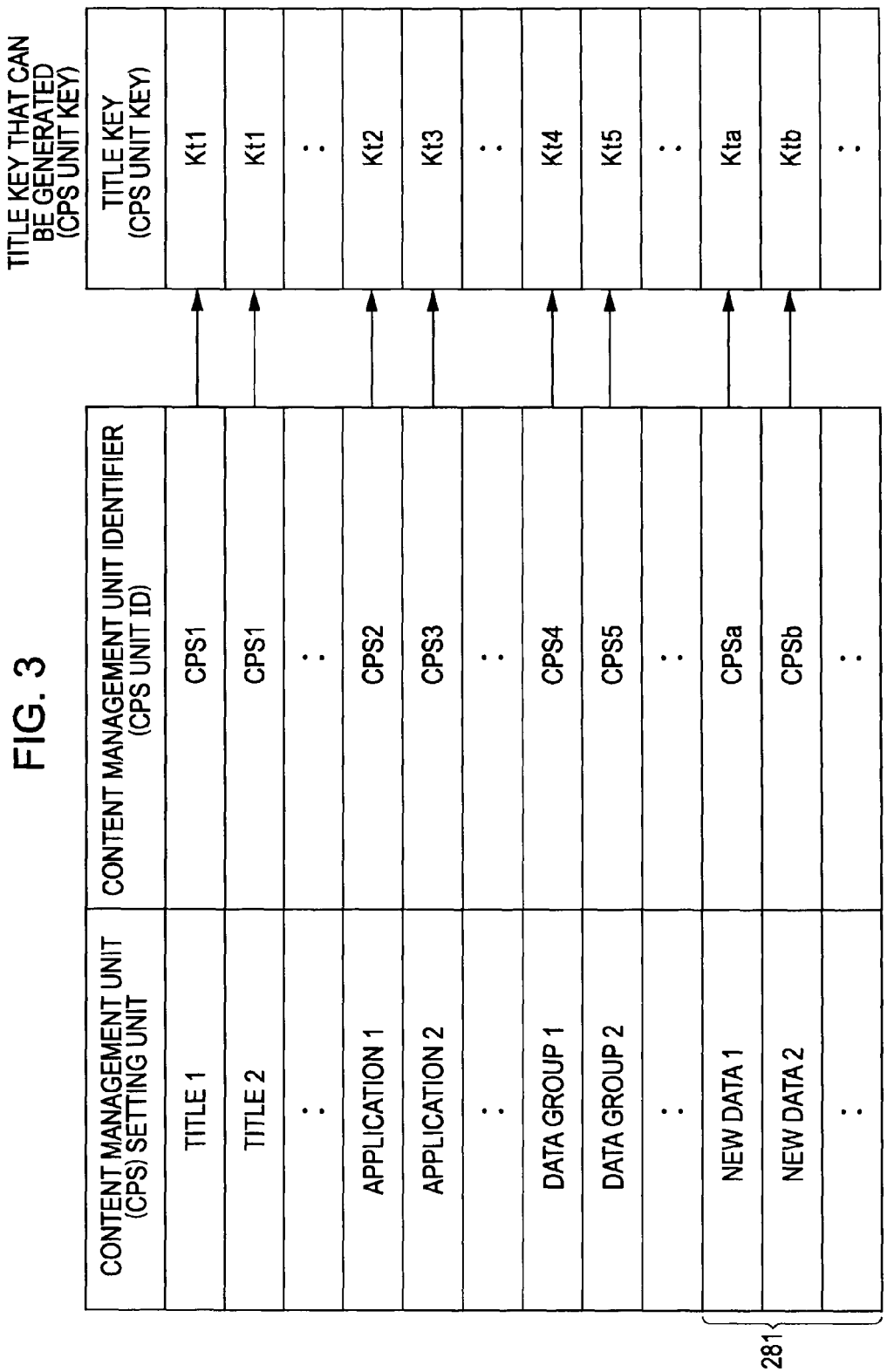
FIG. 3 illustrates the correspondence between content management units that are set in the data stored on the information recording medium and unit keys.

An example of the correspondence between the setting configuration of CPS units and title keys is shown in FIG. 3. FIG. 3 shows the correspondence between CPS unit setting units as use management units of encrypted content stored on an information recording medium and title keys (CPS unit keys) used in each CPS unit. It is also possible to prestore CPS units and title keys for later data. For example, a data part 281 represents entries for later data.

CPS unit setting units are various like the title of content, an application, a data group, and the like. In the CPS unit management table, a CPS unit ID as an identifier corresponding to each of the CPS units is set.

In FIG. 3, for example, a title 1 is a CPS unit 1. When decrypting encrypted content belonging to the CPS unit 1, it is necessary to generate a title key Kt1, and necessary to perform a decryption process on the basis of the generated title key Kt1.

In the manner described above, content to be stored on the information recording medium 100 is assigned with a different key for each unit, is subjected to an encryption process, and is stored for the purpose of realizing different use control for each unit. Use permission information (UR: Usage Rule) for each content management unit (CPS unit) is set for the purpose of individual use management for each content management unit (CPS unit). The use permission information, as described above, is information containing, for example, copy/play control information (CCI) for content, such as copy limitation information and reproduction limitation information for encrypted content contained in each content management unit (CPS unit).

In order to generate a title key, data processes using various information stored on the information recording medium is necessary. Specific examples of these processes will be described in detail later.

[3. Data Structure of Content Containing Modified Data and Overview of Data Conversion Process]

Next, a description will be given below of data structure of content containing modified data and the overview of a data conversion process. The encrypted content 101 contained on the information recording medium 100, as described above, is set as broken data such that some of the data constituting the content has been replaced with data differing from the correct content data. As a result, a correct content reproduction is not performed with only a decryption process, and when reproduction is to be performed, a process for replacing broken data with conversion data registered in a conversion table is necessary.

A description will now be given, with reference to FIG. 4, of the structure of content stored on an information recording medium and the overview of a process for reproducing the content. On the information recording medium 100, for example, AV (Audio Visual) content, such as movies, is stored. These pieces of content are subjected to encryption, and the content can be reproduced after being decrypted by a process using an encryption key that can be obtained by only the reproduction apparatus having a predetermined license. A specific content reproduction process will be described later. Content to be stored on the information recording medium 100 has a structure such that it is encrypted and also the data constituting the content is replaced with modified data.

Figure 4:
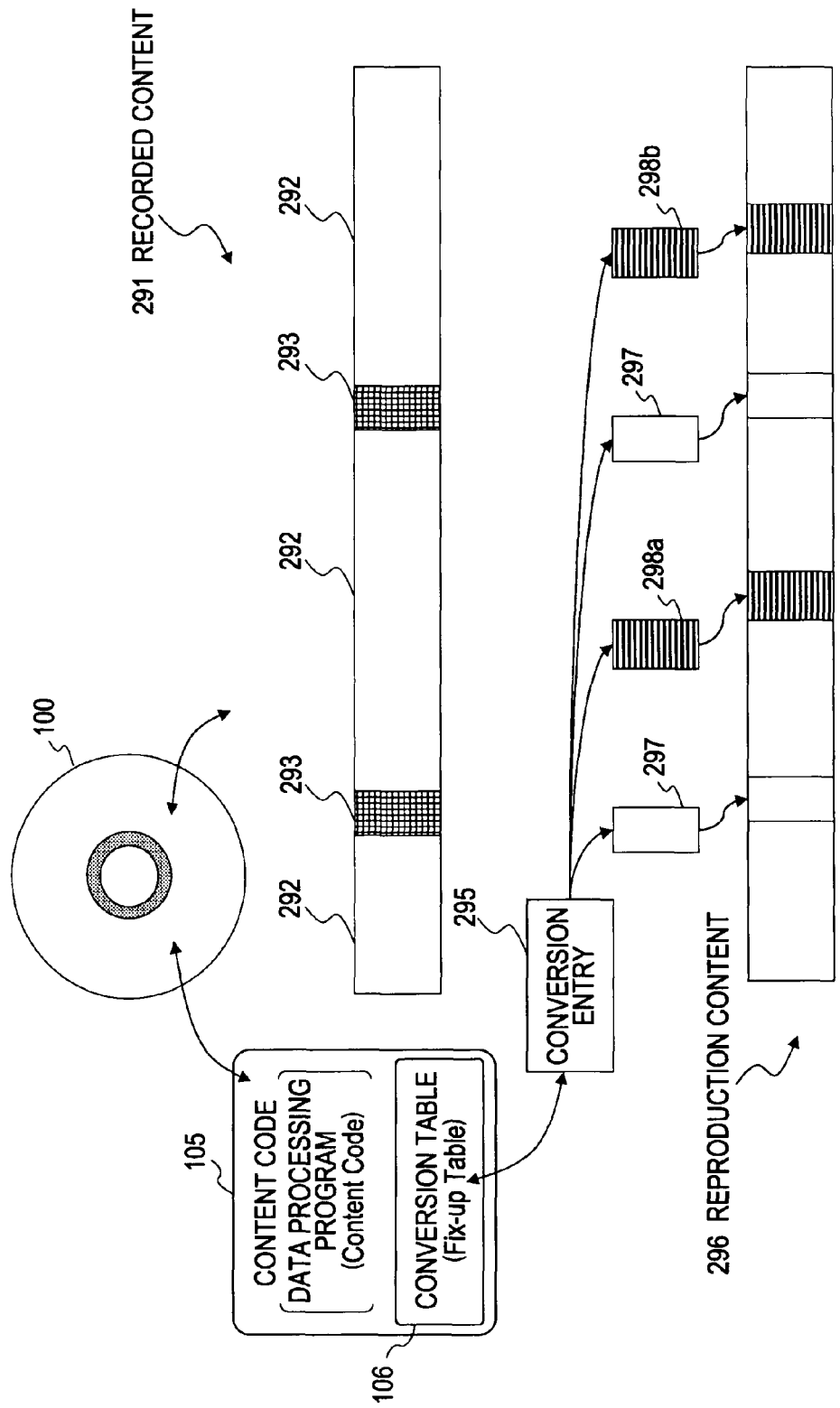
FIG. 4 illustrates content recorded on the information recording medium, and a data conversion process that is necessary in the reproduction of content.

FIG. 4 shows an example of the structure of recorded content 291 stored on the information recording medium 100. The recorded content 291 includes normal content data 292 that has not been modified, and broken data 293 that is modified and destroyed content. The broken data 293 is data such that the original content is destroyed by data processing. Therefore, normal content reproduction cannot be performed by using the content 291 containing broken data.

In order to perform content reproduction, it is necessary to generate reproduction content 296 by performing a process for replacing the broken data 293 contained in the recorded content 291 with normal content data. Regarding data for conversion (conversion data) as normal content data corresponding to each broken data area, the conversion data is obtained from the conversion entry 295 registered in the conversion table (FUT (Fix-Up Table)) 106 (see FIG. 1) within the content code 105 recorded on the information recording medium 100, a process for replacing data in a broken data area with the conversion data is performed to generate the reproduction content 296, and this is reproduced.

When generating the reproduction content 296, in addition to a process for replacing the broken data 293 with conversion data 297 as normal content data, a process is performed for replacing the area of some of the recorded content 291 with identifier setting conversion data 298 containing data (Forensic Mark) by which the bits constituting identification information (for example, player ID) that allows a content reproduction apparatus or a content reproduction application to be identified can be analyzed. For example, when illegally copied content is leaked, it is possible to specify the leakage source of the invalid content by analyzing the identifier setting conversion data 298 within the leaked content.

Conversion entries as data constituting the conversion table containing the conversion data may be configured in such a manner that they are recorded in duplicate in such a manner as to be scattered in specific packets within the content configuration data. That is, the conversion data is recorded in the conversion table 106 shown in FIG. 1, and is also recorded in such a manner as to be scattered in the encrypted content 101, thereby being recorded in duplicate. The information processing apparatus for reproducing content performs one of a process for obtaining conversion data stored in the conversion table 106 and for replacing the data and a process for obtaining conversion entries recorded in such a manner as to be scattered in the content and for replacing the data.

[4. Content Reproduction Process]

Figure 5:
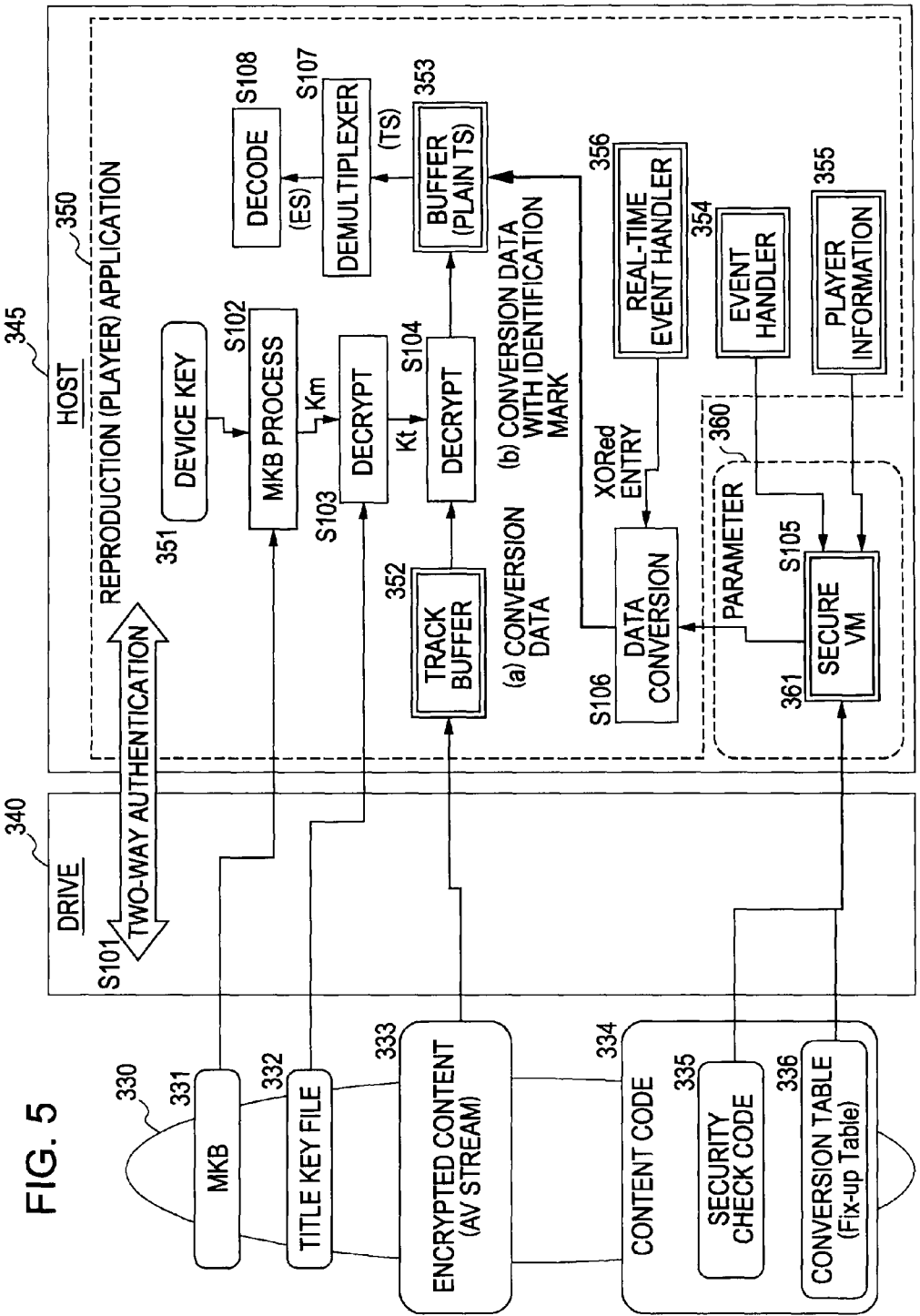
FIG. 5 illustrates an example of a content reproduction process.

Next, a description will be given, with reference to FIG. 5, of a content reproduction process to be performed by a host. In FIG. 5, the following are shown from the left: an information recording medium 330 on which encrypted content is stored, a drive 340 for reading data from the information recording medium 330 set therein, and a host 345 for executing a reproduction application for obtaining content stored on the information recording medium 330 via the drive 340 and for performing a reproduction process, the host 345 being connected so as to be capable of performing data communication with the drive.

The host 345 shown in FIG. 5 is shown so as to make a distinction between a reproduction (player) application block 350 for decrypting content, for performing decoding, for performing a data conversion process, and the like; and a secure VM 360 block having a secure VM 360 for performing a security check process on the basis of security check code contained in the content code recorded on the information recording medium, a parameter computation process applied in a conversion process based on the conversion table, and the like.

The information recording medium 330 contains an MKB (Media Key Block) 331, a title key file 332, encrypted content 333, and content code 334 as recording data. As described previously with reference to FIG. 4, the encrypted content 333 is content such that some of the content needs to be replaced with data obtained from the conversion table.

The content code 334 contains security check code 335 formed of a program and the like for verifying the authenticity of a player (reproduction apparatus) for reproducing content, and a conversion table (Fix-up Table) 336 in which conversion data corresponding to the replacement data of a predetermined area within the content is registered. The host 345 holds a device key 351 used for an MKB process.

A description will now be given of a processing sequence in which the host 345 shown in FIG. 5 obtains content stored on the information recording medium 330 via the drive 340 and reproduces it. Initially, prior to reading content stored on the information recording medium 330, in step S101, the host 345 and the drive 340 perform mutual authentication. The mutual authentication is a process for confirming whether the host and the drive are each an authorized device or application software. In the mutual authentication processing sequence, various processes can be applied. As a result of the mutual authentication process, the drive 340 and the host 345 share a session key (Ks) as a common secret key.

In step S101, the mutual authentication between the host and the drive is performed, and a session key (Ks) is shared. Thereafter, in step S102, the reproduction (player) application 350 of the host 345 obtains an MKB 331 recorded on the information recording medium 330 via the drive, performs a process for the MKB 331 by using a device key 351 stored in the memory, and obtains a media key (Km) from the MKB.

As described above, the MKB (Media Key Block) 331 is an encrypted key block that is generated on the basis of a tree-structure key distribution system, which is known as one type of broadcast encryption method, and is also a key information block in which a media key (Km) that is a key necessary for decrypting information can be obtained by only a process (decryption) based on a device key (Kd) stored in an apparatus having a valid license.

Next, in step S103, by using the media key (Km) obtained in the MKB process in step S102, the title key file 332 read from the information recording medium 330 is decrypted to obtain the title key (Kt). The title key file 332 stored on the information recording medium 330 is a file containing data encrypted using the media key, and a title key (Kt) used to decrypt content can be obtained by the process using a media key. In the decryption process of step S103, for example, an AES encryption algorithm is applied.

Next, the reproduction (player) application 350 of the host 345 reads the encrypted content 333 stored on the information recording medium 330 via the drive 340, stores the read content in a track buffer 352, performs a decryption process on the content stored in the buffer by using the title key (Kt), and obtains the decrypted content in step S104.

The decrypted content is stored in a plain-text TS buffer 353. The "plain TS" means a decrypted plain-text transport stream. Here, decrypted content stored in the plain-text TS buffer 353 is content containing the above-described broken data. If being maintained as it is, the content cannot be reproduced, and predetermined data conversion (replacement of data by overwriting) needs to be performed.

In step S105, the secure VM 361 performs a process for generating parameters and the like that are necessary for data conversion from the content code 334. Thereafter, in step S106, under the control of a real-time event handler 356, a table restoration & data conversion process is performed. Under the control of the real-time event handler 356, the reproduction (player) application 350 outputs a parameter computation request as an interrupt (INTRP) to the secure VM 361 in response to the switching of a segment as content configuration data, sequentially receives a parameter from the secure VM 361, obtains a plain-text conversion table block by decrypting or computing a conversion table block, and obtains a conversion entry contained in the obtained conversion table block.

In the conversion entry, conversion data, that is, (a) conversion data and (b) identifier setting conversion data (Forensic Mark), and recording position specification information in the content of these pieces of the conversion data are recorded. In step S106, the reproduction (player) application 350 performs a data conversion process for writing into a specified position as a real time process in parallel with a content reproduction process or an external output process.

The secure VM 361 generates and outputs, for example, a different parameter to be used for each segment as data constituting the content in accordance with the content code. For example, when the parameters (SP1, SP2, SP3 . . . ) are exclusive OR (XOR) computation parameters with a conversion entry corresponding to the segment, which is a predetermined content part data unit, in a table restoration process in step S303, the following exclusive OR operation processes are performed:

[Conversion entry 1](XOR)[SP1], [Conversion entry 2] (XOR) [SP2], [Conversion entry 3] (XOR) [SP3], :: and conversion entries contained in the conversion table block data are obtained. In the above equations, [A](XOR)[B] is assumed to mean exclusive OR operation between A and B.

In the manner described above, the conversion entry contained in the content 333 recorded on the information recording medium is ORed (exclusive ORed) with parameters (SP1, SP2, SP3 . . . ) and is stored. These parameters are obtained and output one after another by the secure VM 361.

In the table restoration & data conversion process of step S106, a data overwriting process for obtaining conversion data from the restored conversion entry that is obtained by a computation or encryption process using parameters (SP1, SP2, SP3 . . . ), for replacing broken data contained in the content with conversion data that is valid content configuration data, and for interchanging the identifier setting conversion data with some of the data of the content is performed, so that the data stored in the plain-text TS buffer 353 is changed to conversion-processed data. The overview of the data conversion process will be described with reference to FIG. 6.

The encrypted content 333 stored on the information recording medium is temporarily stored in the track buffer 352 on the host side. This is data 401 stored in the track buffer, shown in FIG. 6(1). The decryption process on the host side allows encrypted content as the data 401 stored in the track buffer to be decrypted, and the decryption result data is stored in the plain-text TS buffer 353. This is decryption result data 402 shown in FIG. 6(2).

The decryption result data 402 contains broken data 403 that is not normal content configuration data. A data conversion processor of the host performs a process for replacing the broken data 403 with conversion data 404 as correct content configuration data. This replacing process is performed, for example, as a rewriting (overwriting) process for rewriting some data in the data written into the plain-text TS buffer 353.

Figure 6:
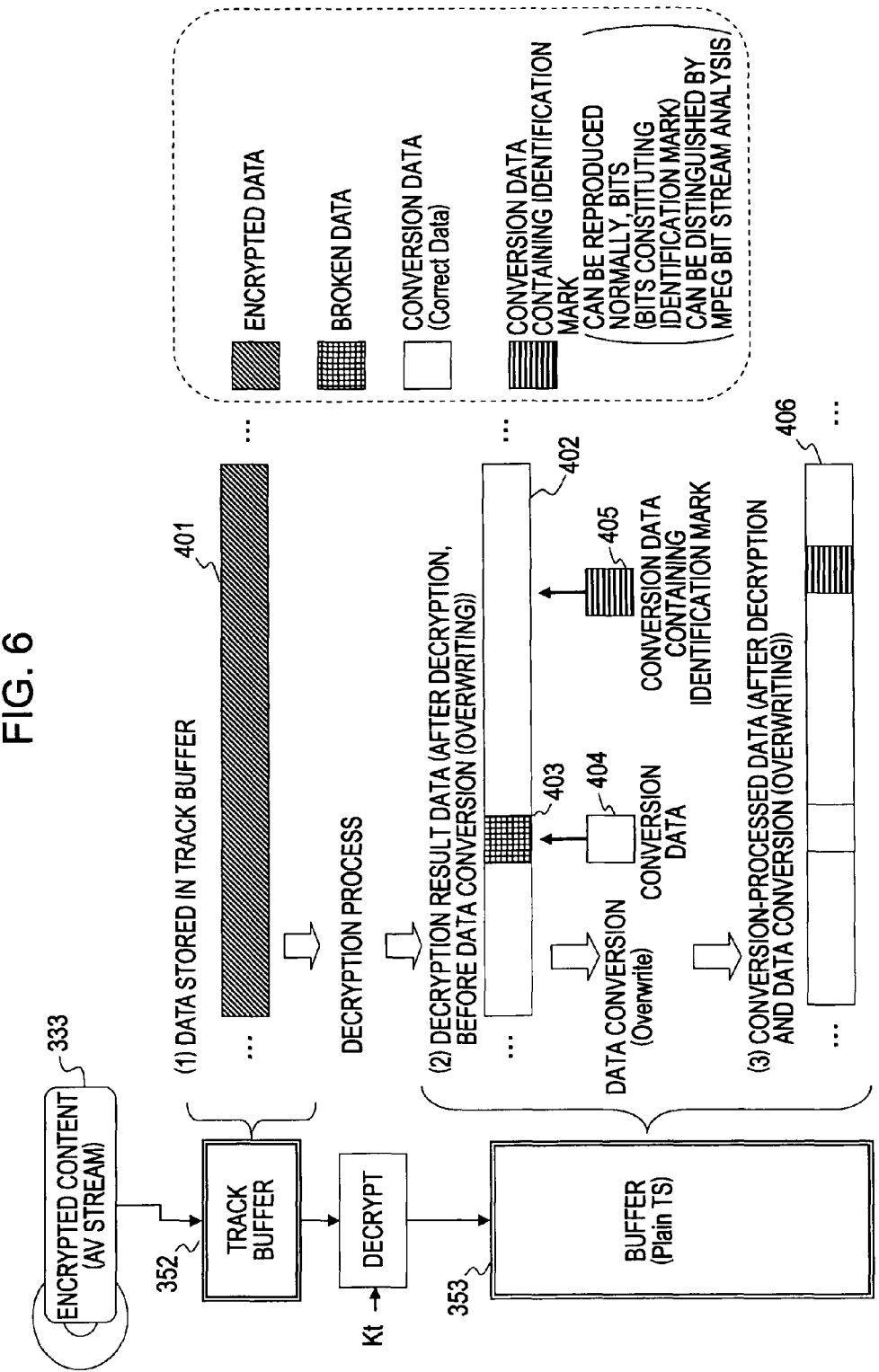
FIG. 6 illustrates a data conversion process to be performed when content is reproduced.

Furthermore, for the data conversion process to be performed by the host, not only a process for replacing broken data with conversion data that is normal content data, but also a process for replacing data constituting a portion of the decryption result data 402 with the identifier setting conversion data 405 is performed, as shown in FIG. 6.

The identifier is data by which the bits constituting identification information that allows a content reproduction apparatus or a content reproduction application to be identified can be analyzed as described above. More specifically, for example, the identifier is an identification mark generated on the basis of data constituting the identification information (player ID) of the information processing apparatus as a player for executing a host application or on the basis of the player ID. The identifier setting conversion data is data in which the bit values of the correct content data are slightly changed at a level that does not influence the reproduction of the content as described earlier.

Many pieces of the identifier setting conversion data 405 are set within the content. By accumulating and analyzing the plurality of pieces of identifier setting conversion data 405, for example, a player ID is determined. The identifier setting conversion data 405 is data in which the bits constituting the normal content data are changed at a level at which the content can be reproduced normally, and is also data for which determination of bits (bits constituting an identification mark) is possible by analyzing an MPEG bit stream.

Many pieces of the conversion data 404 and the identifier setting conversion data 405, shown in FIG. 6, are registered in the conversion table stored on the information recording medium, and the writing position information thereof is also registered. By performing a data conversion process on the basis of the conversion table storage information, data stored in the plain-text TS buffer 353 is replaced with conversion-processed data 406 shown in FIG. 6(3).

Thereafter, the converted TS (transport stream) is output to the outside via a network or the like, and is reproduced by an external reproduction device. Alternatively, in step S107, as a result of a process by a demultiplexer, conversion from the transport stream (TS) to an elementary stream (ES) is performed, and furthermore, after a decoding process (step S108) is performed, the stream is reproduced via a display/speaker.

[5. Process Using Security Check Code]

Before the above-described content reproduction process is started, the secure VM 361 performs a security check using the security check code 335 within the content code 334. The secure VM 361 further performs a security check using the security check code 335 as necessary also during the period in which the content reproduction process is performed.

Under the control of the event handler 354, the secure VM 361 performs a process for verifying the authenticity of the player (reproduction apparatus) in accordance with the security check code 335 contained in the content code 334. As described above, in order for a process in accordance with the type of player as a reproduction apparatus to be possible, the conversion table (Fix-up Table) 336 and the security check code 335 are set to contain various kinds of codes.

The secure VM 361 obtains, as player information 355, a player certificate stored in the storage section of the reproduction apparatus and player configuration information such as information on, for example, ports possessed by the reproduction apparatus, selects security check code corresponding to its own player from the security check code 335 contained within the content code 334, and performs a security check process. That is, the secure VM 361 obtains at least one of the identification information and the attribute information corresponding to the information processing apparatus or the content using application as player information, selects security check code corresponding to such player information, and performs a security check process on the basis of the selected code.

In the manner described above, when content stored on the information recording medium is to be used, a security check is performed by the secure VM 361. After the security check by the secure VM 361 demonstrates that the apparatus is an authorized apparatus for which use of content is permitted and the fact that unauthorized output of content to the outside will not be performed is verified on the basis of the apparatus configuration information, the content is reproduced.

For such a security check, there are cases in which a different process is requested according to the configuration of the reproduction apparatus and the type of reproduction application. For this reason, the security check code is recorded within the content code as a set of codes corresponding to various apparatuses and applications.

Figure 7:
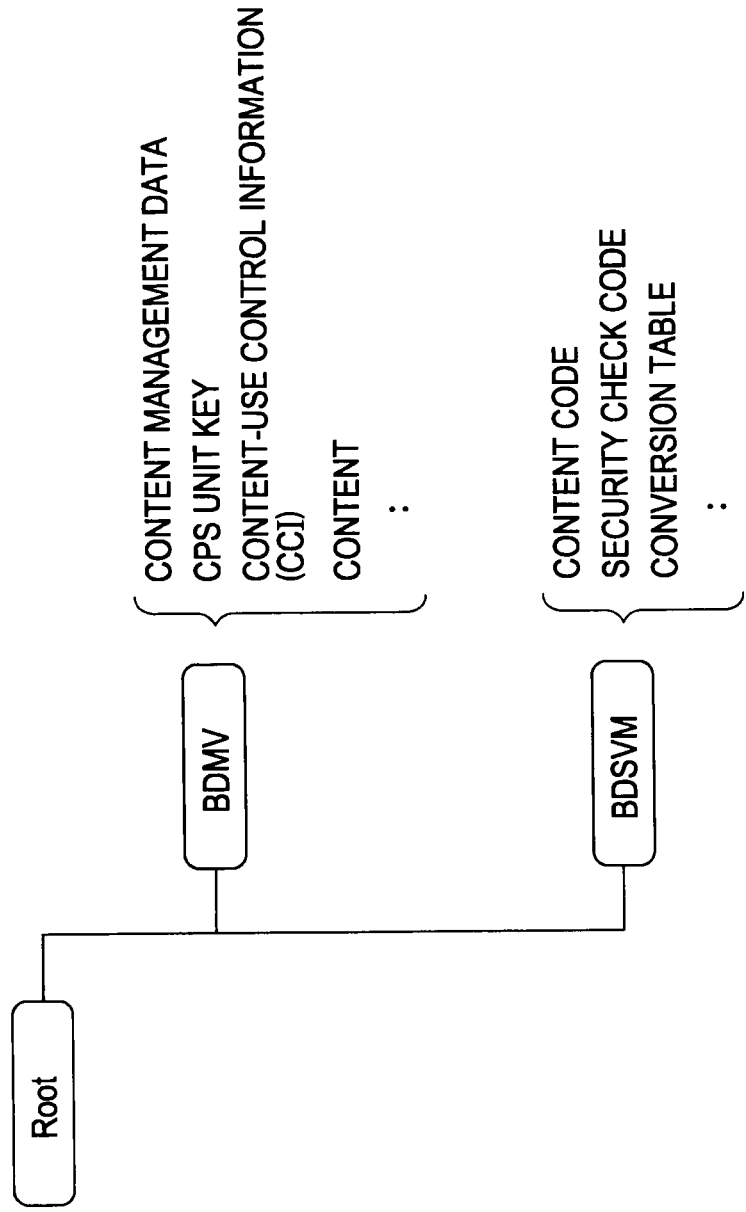
FIG. 7 shows the directory structure of data recorded on the information recording medium.

A description will now be given, with reference to the figure, of a mode of recording content code on an information recording medium. FIG. 7 shows the directory structure of the whole data stored on the information recording medium. Data stored on the information recording medium is broadly classified into two types of data. One type has a BDMV directory in which content-related data containing content management data, CPS unit keys, content-use control information (CCI), content, and the like, are set, and a BDSVM directory in which content code containing security check code, a conversion table, and the like are set.

Figure 8:
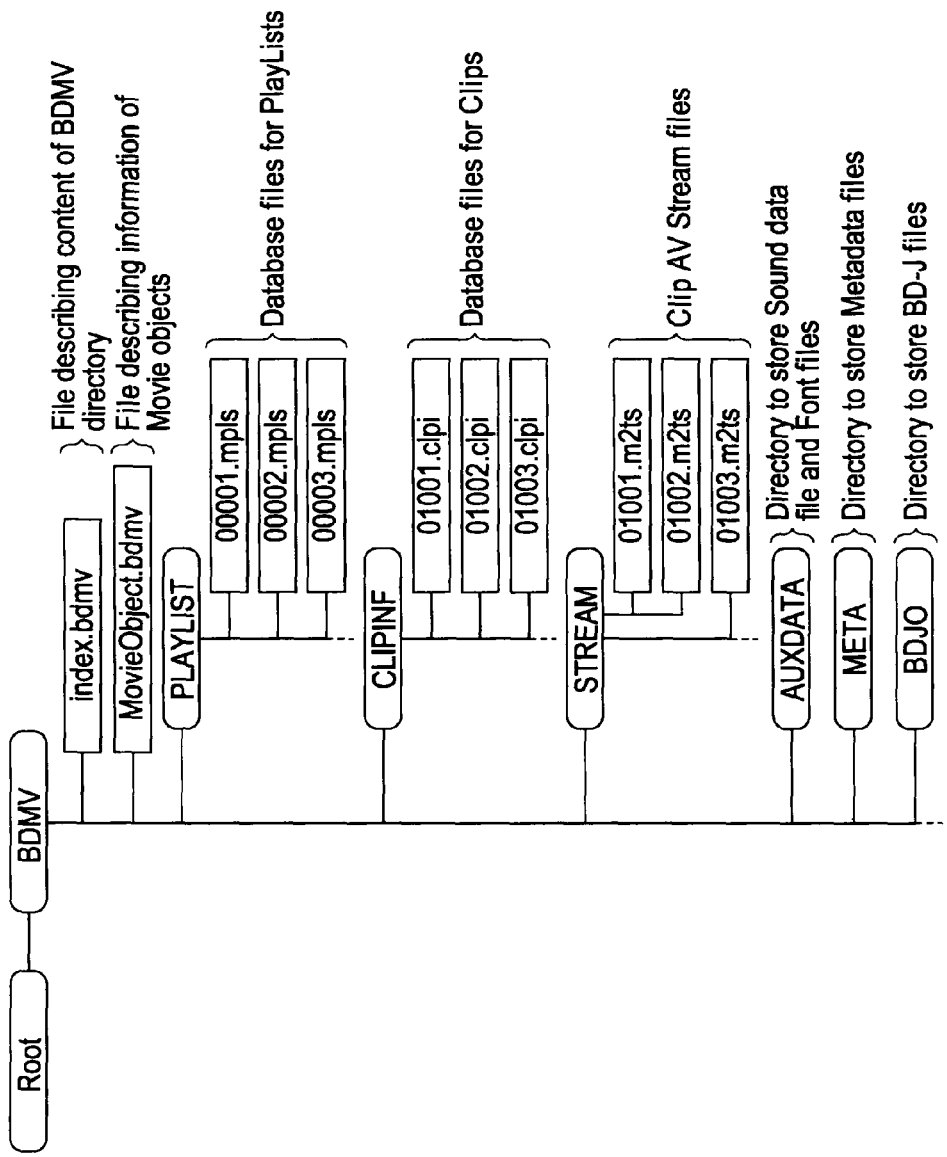
FIG. 8 shows the directory structure of content, management data, and the like to be recorded on the information recording medium.

An example of the details of each of these directories will be described with reference to FIGS. 8 and 9. When content having the hierarchical structure described previously with reference to FIG. 2 is to be stored on an information recording medium, various data or programs such as content code are recorded as individual files, and are stored on the information recording medium in accordance with, for example, the directory setting shown in FIG. 8. The following are stored on an information recording medium:

(A) An index 210 in FIG. 2 is an index.bdmv file in the directory shown in FIG. 8.

(B) A movie object 220 in FIG. 2 is a MovieObject.bdmv file in the directory shown in FIG. 8.

(C) A playlist 230 in FIG. 2 is a file under a PLAYLIST directory in the directory shown in FIG. 8.

(D) A clip 240 in FIG. 2 corresponds to a pair of a file under a CLIPINF directory in the directory shown in FIG. 8 and a file under a STREAM directory, the pair having the same file number.

(E) In addition, an AUX DATA file having audio data and font data stored therein, a META file having meta data stored therein, and a BDOJ file having a BD-J object stored therein.

The content stored on the information recording medium is set as broken data such that, as described above, some of the data constituting the content is replaced with data differing from correct content data, and, the content is not correctly reproduced with only a decryption process. Therefore, when reproduction is to be performed, it is necessary to perform a process for replacing the broken data with data (conversion data) registered in the conversion table. For the replacement process, a data conversion process using data registered in the conversion table (Fix-up Table) is performed by using content code stored on the information recording medium.

The conversion table and the content code containing security check code are also stored as individual files on the information recording medium. The directory structure in which content code is set is shown in FIG. 9. FIG. 9 shows the directory structure of content code, which is produced with respect to, for example, AV content having the directory structure of FIG. 8.

The content code contains security check code and a conversion table in the manner described above. The content code stored on the information recording medium, as shown in FIG. 9, is stored in a plurality of individual files [nnnnn.svm] that are set in the BDSVM directory. Furthermore, in a BACKUP directory, back-up data as copy data is set.

The files of these content codes are classified into categories of the following, for example, (a) Content code common to all content & all players (apparatuses or reproduction applications), (b) Content code specific to content, (c) Content code specific to player (apparatus or reproduction application), and (d) Content code specific to content & player (apparatus reproduction application).

As a result of the classification into categories of the above (a) to (d), the content code can be set as data files independent of one another, and the content code files can be reused. That is, there are cases in which the content code files can be used in common with different content and different players (apparatuses or reproduction applications). The configuration of such reuse of content code will be described with reference to FIG. 10.

Figure 10:
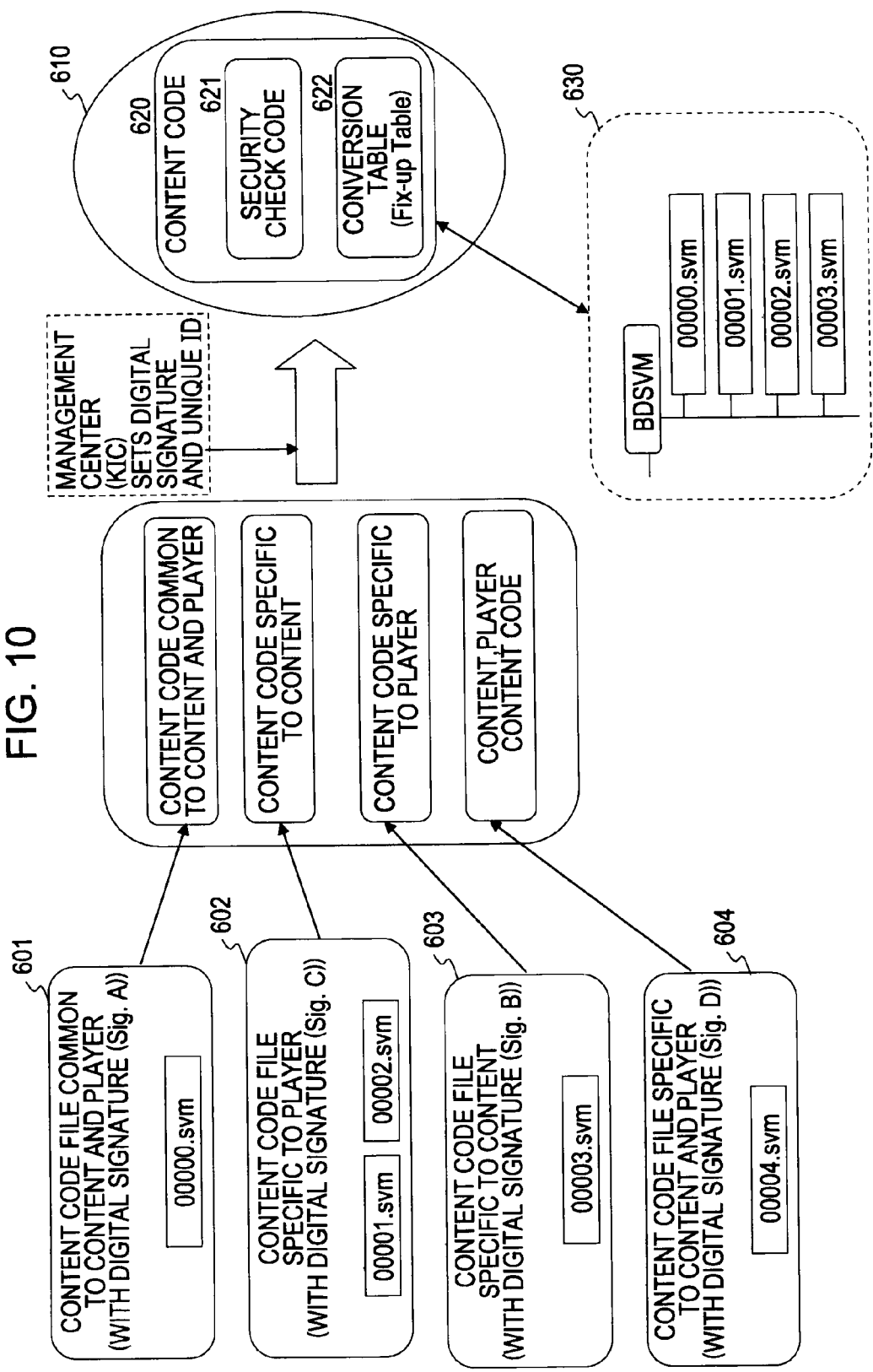
FIG. 10 illustrates the details of processes for generating and recording content code to be recorded on the information recording medium.

In FIG. 10, for example, content code files 601 to 604 are each a content code file possessed by each content code production entity or each providing entity. The content code files 601 to 604 indicate the content code files of the following, respectively, a content code file [00001.svm] 601 common to content and the player, content code files [00001.svm] and [00002.svm] 603 specific to player, a content code file [00003.svm] 602 specific to content, and a content code file [00004.svm] 604 specific to content and player.

A digital signature by each content code production entity or each providing entity is attached to the content code files 601 to 604, and these are stored and managed by each entity.

When an information recording medium on which new content is recorded is to be produced, it is possible for each entity to reuse the content code files 601 to 604 that have already been used in another content recording information recording medium.

In order to prevent tampering of content code, each content code file is provided to the management center. In the management center, the content code file is stored on an information recording medium 610 with a digital signature being set. A digital signature by the management center (KIC) and a unique ID set by the management center are attached to content code to be recorded on the information recording medium 610. Content code 620 recorded on the information recording medium 610 contains security check code 621 and a conversion table 622, as shown in the figure. A specific directory structure is a structure in which content code generated by each entity is individually set, as shown by a directory structure 630.

As described above, the content code can be reused in such a manner as to correspond to various content. Content code that needs to be changed so as to correspond to each piece of content and reusable content code are combined as appropriate and recorded on an information recording medium.

Figure 9:
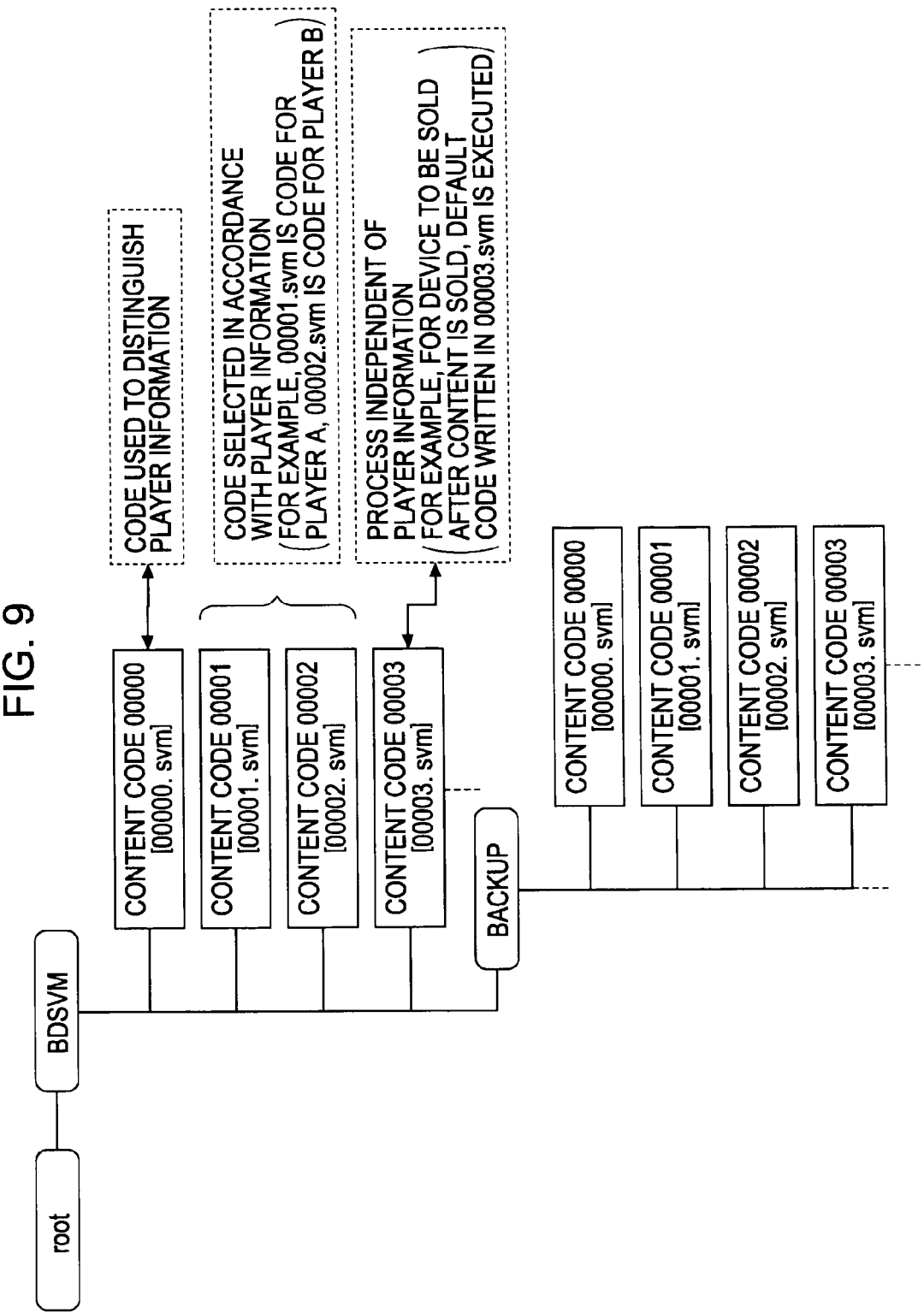
FIG. 9 shows the directory structure of content code to be recorded on the information recording medium.

Furthermore, as shown in FIG. 9, each content code file can also be configured to be set according to the following classification.

Content code file [00000.svm]: code used to determine player information

Code content code files [00001.svm] and [00002.svm]: code selected according to player information (for example, 00001.svm is code for player A, 00002.svm is code for player B, and the like)

Content code file [00003.svm]: process independent of player information (for example, for apparatus to be sold after content is sold, default code written in 00003.svm is executed)

As described above, on the information recording medium, different content codes classified into various types are stored. The player (reproduction apparatus) for performing a security check using content code selects security check code corresponding to its own player and performs a security check.

The secure VM 361 shown in FIG. 5 selects security check code corresponding thereto and performs a security check process. In this case, the secure VM 361 receives the player information 355, and performs a security check process using the security check code.

The player information 355 contains, for example, a player certificate stored in the memory of the reproduction apparatus, player configuration information such as information on, for example, ports possessed by the reproduction apparatus, and the like. These pieces of information include various kinds of information, such as information that can be directly obtained by the secure VM 361, information that can be obtained by a reproduction application, information that can be obtained by the OS, and the like.

One of security check processes to be performed by the secure VM is confirmation of the fact that the apparatus has a valid player certificate. The player certificate is a certificate verifying the content use right and is issued by a management entity for managing content.

An example of the data structure of the player certificate is shown in FIG. 11. As shown in FIG. 11, the player certificate has the following data, the player certificate size, the certificate version, the player manufacturer identifier, the serial number, the signature date and time, the device (player) attribute information, the player public key, and the digital signature. In addition to these pieces of data, for example, the name of a player model, the version information of the player model, and the like may be contained.

The secure VM 361 performs a process for verifying the player certificate on the basis of the security check code read from the information recording medium, confirms the authenticity, and thereafter can obtain information necessary for subsequent security checking from the certificate. As a specific process, initially, the secure VM 361 performs a process for verifying the signature of the player certificate. For example, signature verification using the public key of the management center that is an execution entity of the signature of the player certificate is performed. The public key of the management center, which is obtained in advance and held in the memory of the apparatus, may be used, or may be obtained from the information recording medium or via a network.

When the authenticity of the player certificate is not confirmed by the signature verification, shifting to content reproduction involving subsequent data conversion is stopped. When the authenticity of the player certificate is confirmed, a security check corresponding to the player is further performed. Basic player information, such as the manufacturing maker, can be obtained from the player certificate.

That is, the secure VM 361 performs a process for verifying the authenticity of the player certificate. Under the condition that the authenticity has been confirmed, the secure VM 361 performs a process for obtaining, from the recording information of the player certificate, identification information or attribute information corresponding to the information processing apparatus or the content using application, that is, the maker, the model type, the version, the serial number, and the like of the apparatus and the application. On the basis of the obtained information, security check code corresponding to the obtained information is selected, and a security check process based on the selected code is performed. Player information, such as apparatus configuration information that is necessary for a security check process, is obtained by, for example, an information obtaining process of the reproduction application and the secure VM.

[6. Encryption Key Distribution Configuration for Information Processing Apparatus, Content Code Encryption, and Use Processing Configuration]

As described previously, the secure VM 361 performs a security check process based on security check code contained in the content code recorded on an information recording medium, a parameter computation process applied in a conversion process based on the conversion table, or other processes. When performing such a process, the secure VM 361 performs a process for verifying the authenticity of the player certificate, determines the information processing apparatus or the content using application on the basis of the recording information of the player certificate under the condition that the authenticity has been confirmed, selects security check code corresponding to the determined information, performs a security check process on the basis of the selected code, and computes parameters necessary for converting content in the data conversion process using the above-described conversion table (Fix-up Table).

For replacing data on the basis of the conversion table, as described previously, conversion using the following data is performed:

(a) Conversion data (b) Identifier setting conversion data (Forensic Mark).

The security check using security check code and the data conversion process to be performed on the basis of the conversion table are processes that should be performed on the basis of the content code selected on the basis of correct player information. However, there is a possibility that an unauthorized reproduction apparatus may perform a process using invalid player information by, for example, copying a player certificate from another apparatus. When the type of player corresponding to the information processing apparatus or the reproduction application is determined on the basis of only the verification of the player certificate, and a security check process and a data conversion process are performed on the basis of content code compliant with the player, there are cases in which content can be used by circumventing the originally necessary security checking. Also, a case can occur in which identifier setting conversion data (Forensic Mark) that should originally be embedded into content becomes data containing player information differing from correct data. Even if content into which such invalid player information is embedded is tracked, a problem occurs in that it is not possible to track down an unauthorized player.

Furthermore, for example, the following situation can occur in which an information processing apparatus, such as a PC for which a very strict security check is requested, copies the player certificate of a play-only device for which use of content is permitted with only a more lenient security check, and stores it in the PC. In the PC, a determination as to the player is made by using the player certificate of the play-only device, and the content is used with only a lenient security check being performed.

As described above, when the information processing apparatus does not provide correct player information, the content is used illegally, and it is difficult to track down a wrong act. That is, if incorrect player information is provided, there is a possibility that correct security checking is not performed, correct data conversion based on a conversion table is not performed, and embedding of player information into the content is also not correctly performed. In the following, a description will be given of a configuration for preventing such a wrong act.

That is, the following configuration will be described: also when the apparatus side provides invalid player information, correct content code compliant with each player is selected, a proper security check process corresponding to the information processing apparatus and the reproduction application that uses content is performed, and correct player information is embedded also in the data conversion process using the above-described conversion table.

In order to select and execute correct content code compliant with a player, in this example of processing, a set of unique encryption keys in accordance with a specific rule is distributed to each of many information processing apparatuses for reproducing content. Furthermore, at least some of the content code that is recorded on the information recording medium and that is executed by the secure VM is made to be encrypted data using an encryption key distributed to the information processing apparatus. The encryption key distribution configuration and an example of processing will be described below.

First, the encryption key distribution configuration will be described below with reference to FIG. 12 and subsequent figures. The key management center distributes a predetermined encryption key set to each player, that is, an information processing apparatus for executing a reproduction application for reproducing content. The object to which the encryption key set is distributed can be set to any one of the reproduction application and the information processing apparatus for executing a reproduction application. In this connection, the key management center holds registration information on the distribution destination of the encryption key set. For example, a registration table in which an identifier specific to each reproduction application or an identifier specific to an information processing apparatus, and the distribution encryption key set are associated with each other is stored and managed.

FIG. 12(a) illustrates a key set distributed by the key management center to each player. In the following description, the "player" is a concept that includes a reproduction application and an information processing apparatus for executing a reproduction application, and is an object to which the encryption key set distributed by the key management center is to be distributed.

As shown in FIG. 12(a), the key management center sets a key tree in which a key [player manufacturing entity key (Manufacture key)] that is set so as to correspond to a player manufacturing entity for manufacturing a player, which is an information processing apparatus or a reproduction application, is an apex, and n (in the example of the figure, n=256) lower-order keys from one apex or branch point (node) are set. For example, for the keys at the second stage just under the player manufacturing entity key at the apex of the key tree, for example, 256 different group keys G1 are set from G1-1 to G1-256 for different models of the player that is manufactured and sold by the player manufacturing entity.

Furthermore, for the keys at the third stage, G2-1 to G2-256*256 keys, that is, $256^2$ different group keys G2, are set for G2 models as later versions of devices, which are derived from the models of the G1 layer. Hereafter, for different versions of the models, $256^3$ different group keys G3 are set at the third stage, $256^4$ different group keys G4 are set at the fourth stage, and so on. A node (leaf) at the bottommost layer is assigned for each player, and a player specific key [Player_Specific_Key] corresponding to each player is set.

Each player holds a key corresponding to each node in the route from one node (leaf) at the bottommost layer up to the apex node of the hierarchical structure. For example, the group key G1-631 is distributed to players corresponding to leafs at the right half among the players corresponding to the leafs at the bottommost layer in the hierarchical structure shown in the figure, but is not distributed to the players corresponding to the leafs at the left half. Furthermore, the group key G2-632 is distributed to the players corresponding to the leafs at one quarter of the right side among the players corresponding to the leafs at the bottommost layer in the hierarchical structure shown in the figure, but is not distributed to the players corresponding to the leafs at the other three quarters of the left side. In the manner described above, a set of encryption keys distributed to each player is set differently. Specific setting of a key stored in the player will be described later with reference to FIG. 12(c). A public key certificate [Player_Cert] in which a player secret key [Private_Key] and a public key corresponding to a player are stored is also assigned to each player.

Keys that are set from the apex node to a leaf in the hierarchical structure shown in FIG. 12(a) are referred to as hierarchical keys or node keys. The example of setting of a model and a version corresponding to layers of a hierarchy is one example. The hierarchical setting is limited to just layers of the model and the version, and hierarchical setting according to the division of multiple layers using, for example, a licensee, a platform, a model, a version, and the like is also possible. Furthermore, setting, such as grouping by sale area or grouping by manufacturing date and time, is also possible. As described above, each layer of the hierarchy can be set variously.

A player identifier [PlayerID] is stored in the public key certificate [Player_Cert] in which the public key corresponding to the player is stored. The player identifier is a unique identifier different for each player. For example, values of 0x00000000 to 0xFFFFFFFF are set as player IDs corresponding to the players.

FIG. 12(b) shows keys managed by the player manufacturing entity. These keys are generated in accordance with a rule determined by the player manufacturing entity, such as being set for each player manufactured by the player manufacturing entity. The player manufacturing entity holds management information in which each key and the model and the version of the player to which the key corresponds are associated with each other.

FIG. 12(c) shows a key set held by the player. As described previously, each player holds a key corresponding to each node in the route from the one node (leaf) at the bottommost layer corresponding thereto up to the apex node of the hierarchical structure. Within the key set shown in FIG. 12(c), keys from the player manufacturing entity key (Manufacture key) to the player unique key (Player_Specific_Key), the player secret key (Private_Key), and the player public key certificate (PLAYER_CERT) are key data that is distributed from the key management center. Furthermore, the player holds a player manufacturing entity key (Manufacture key #n) managed by the player manufacturing entity. Information on these keys may be stored in the memory of the information processing apparatus at the stage in which the information processing apparatus as a player is manufactured or may be obtained via a network.

Within the key set shown in FIG. 12(c), keys to which a [*] mark is attached, that is, keys from the player manufacturing entity key (Manufacture key) to the player unique key (Player_Specific_Key) that are distributed by the key management center, the player secret key (Private_Key), and the player manufacturing entity key (Manufacture key #n) that is distributed by the player manufacturing entity are keys that need to be securely held and for which leakage needs to be prevented. It is not particularly necessary to securely hold the public key certificate.

The set of encryption keys distributed to each player, as described previously, is a group key and a player specific key of each node from the leaf corresponding to the player up to the apex node in the hierarchical structure, and is set differently. Specific setting of keys stored in the player will be described later with reference to FIG. 12(c). A public key certificate [Player_Cert] in which a player secret key [Private_Key] and a public key corresponding to the player are stored is also assigned to each player.

Next, a description will be given, with reference to FIG. 13, the mode of a process for encrypting content code to be stored on an information recording medium. As described previously with reference to FIG. 10, content code can be classified into the following four categories.

(a) Content code used in common with all content & all players (apparatuses or reproduction applications)
(b) Content code specific to content
(c) Content code specific to player (apparatus or reproduction application)
(d) Content code specific to content & player (apparatus or reproduction application)

Each of these codes, as described previously with reference to FIG. 9, is stored as an individual file on an information recording medium or stored as one file by being accumulated on an information recording medium. There are cases in which these content codes of each category are generated by different entities that generate code. For example, (b) content code corresponding to the content specific data is set by a studio that is a manufacturer of the content, or the like. (c) Data specific to player (apparatus or reproduction application) is often generated by an entity that produces a reproduction apparatus as a player and a reproduction application.

A description will now be given, with reference to FIG. 13, of the sequence until content code generated by different entities is recorded on an information recording medium in the manner described above. FIG. 13 shows steps of recording data constituting the content code corresponding to the above-described four categories on an information recording medium, that is, content code of the following four different categories.

(a) Content code used in common with all content & all players (apparatuses or reproduction applications): for example, codes for a tart-up routine, a common routine (access to external records, and the like), a player identification routine, and the like are contained.

(b) Content code specific to content: for example, conversion table (Fix-Up Table) information, title initialization (including a Fix-Up Table generation process) process code, and the like are contained.

(c) Content code specific to player (apparatus or reproduction application): for example, codes used for a run native execution part, a check routine specific to a player, and the like are contained.

(d) Content code specific to content & player (apparatus or reproduction application): for example, codes for a discovery RAM execution part, a discovery RAM, and the like are contained.

These content codes are sometimes generated by different entities, such as a studio for creating and editing content, an authoring company for creating and editing content, and a player (apparatus or reproduction application) manufacturing maker.

Each of these content code component generation entities prepares content code under the assumption that some of content code is encrypted using keys specific to a licensee/platform/model/version, and the like described previously with reference to FIG. 12 in step S201, that is, node keys (a group key [Gn] and a player specific key) described previously with reference to FIG. 12.

Furthermore, each content code component generation entity generates content code encryption configuration information 642 having encryption configuration information of each content code and sends it together with the generated content code to the key management center. The content code encryption configuration information 642, as shown in the figure, includes data of the correspondence among a content code number as content code identification information, encryption segment information, and specification information on a key used in the encryption segment.

In the key management center, encryption based on the content code encryption configuration information 642 is performed on the content code received from each content code component generation entity. That is, the key management center obtains a key specified in the content code encryption configuration information 642 from the issued key database formed of key information of the hierarchical structure described with reference to FIG. 12(a), and encrypts the specified portion of the content code specified in the content code encryption configuration information 642.

In the manner described above, encrypted content code 641 shown in FIG. 13 is generated, and the encrypted content code 641 is sent to a disc factory that is an information recording medium manufacturing entity, whereby it is recorded on a disc. The content code encryption configuration information 642 is also sent to a disc factory, whereby it is recorded on a disc. The content code encryption configuration information 642 is set to be recorded in such a manner as to be contained in the data constituting the content code on an information recording medium or is set to be recorded as a unique independent file on an information recording medium.

Figure 12:
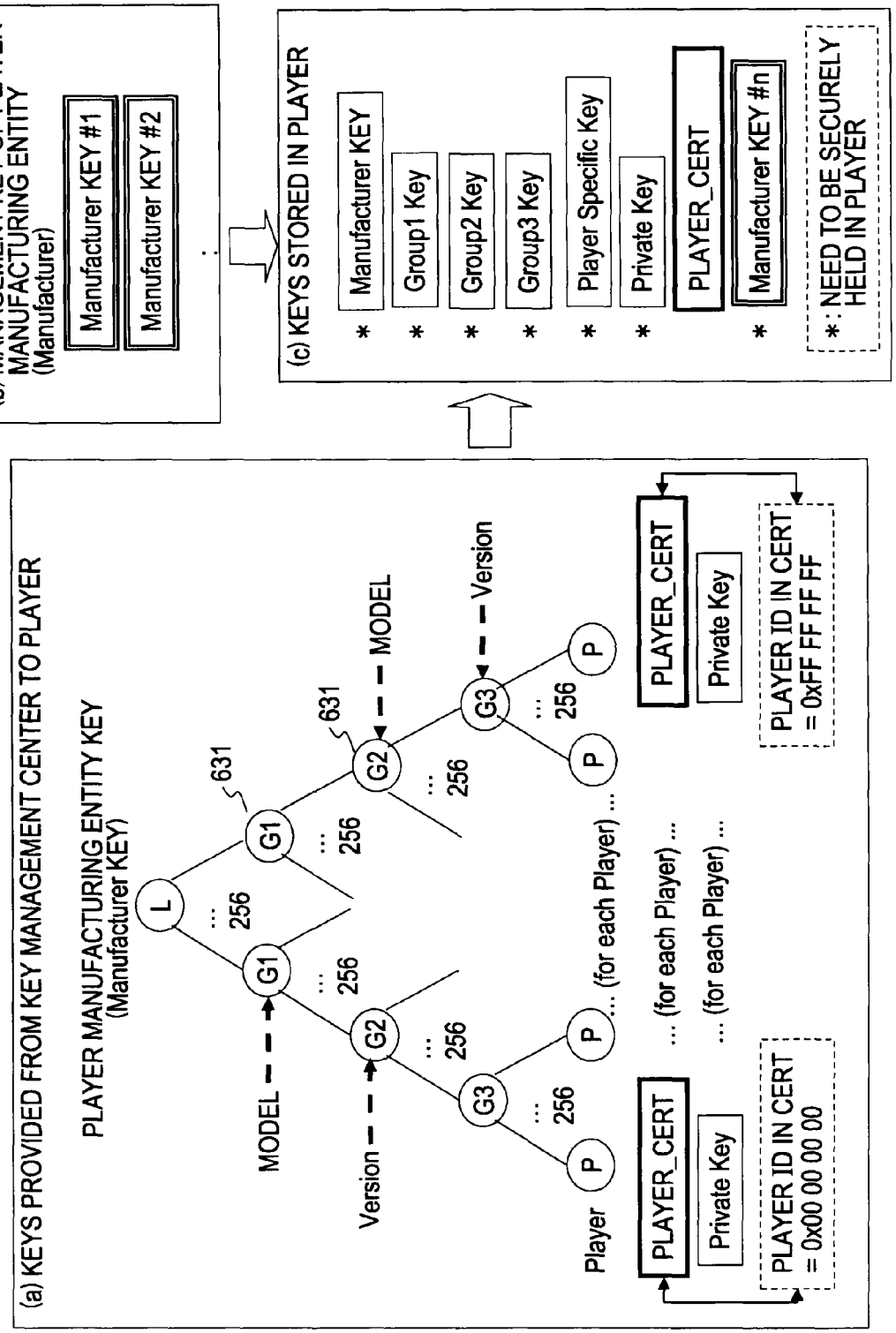
FIG. 12 illustrates an example of setting encryption keys to be distributed to players.
Figure 13:
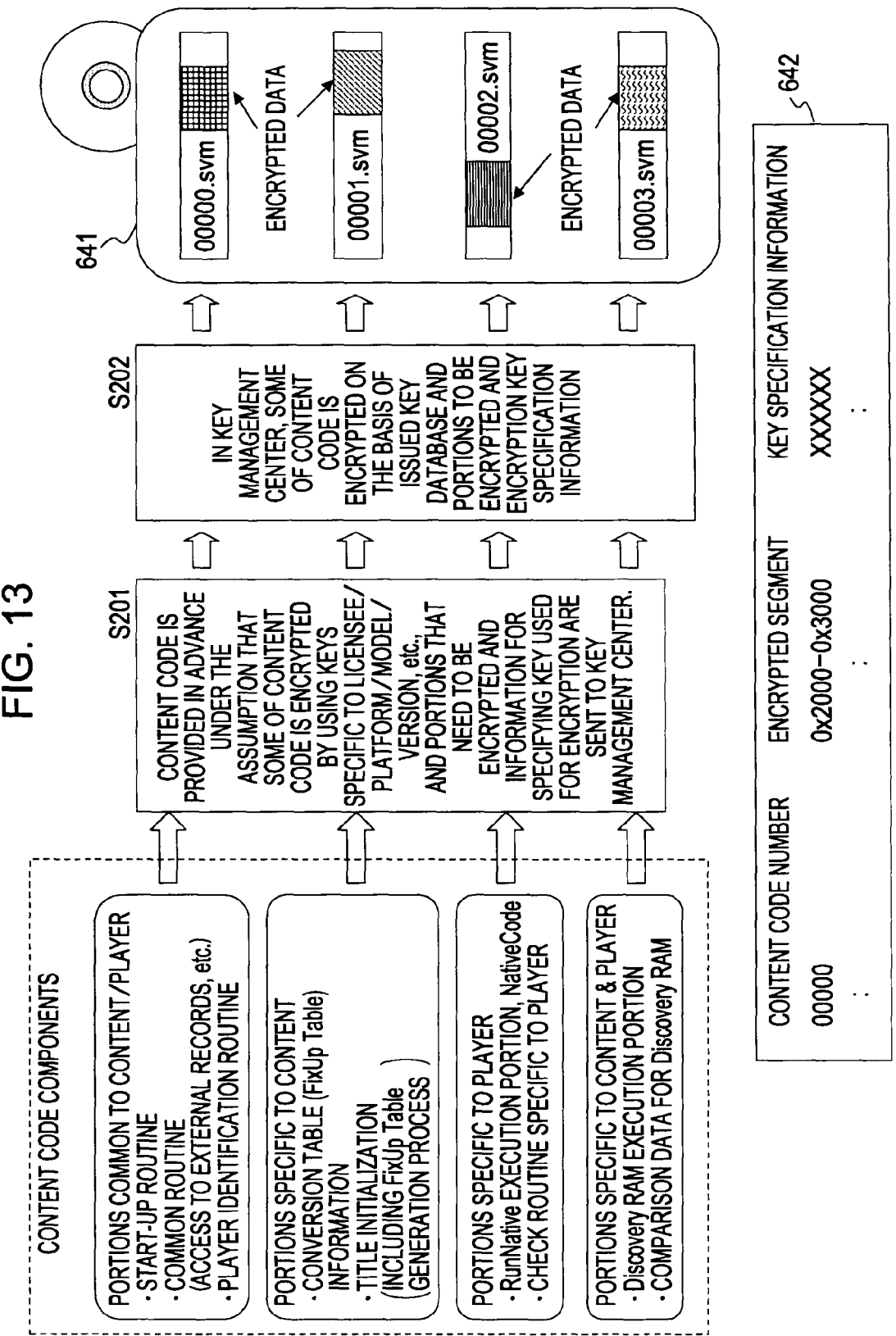
FIG. 13 illustrates processes for generating and encrypting content code to be stored on the information recording medium.

In FIG. 13, as the encrypted content code 641, four content code files [00000.svm] to [00003.svm] are shown. These content codes each contain partially encrypted data. The encryption key used for these encryptions is, for example, the group key Gn described with reference to FIG. 12(a), and has been encrypted using the key selected on the basis of the content code encryption configuration information 642.

For example, if the content code file 00000.svm has been encrypted using the group key G1-631 shown in FIG. 12(a), only the player holding the group key G1-631 can decrypt the encrypted data. Thus, only the players corresponding to the leafs on the right half among the players corresponding to the leafs of the bottommost layer in the hierarchical structure shown in FIG. 12 can use encrypted part data of the content code 00000.svm. Since the players corresponding to the leafs on the left half do not hold the group key G1-631, they cannot use the encrypted part data of the content code 00000.svm.

Similarly, if, for example, the content code file 00001.svm has been encrypted using the group key G2-632 shown in FIG. 12(a), only the players holding the group key G2-632 can decrypt the encrypted data. Thus, only the players corresponding to the leafs in one quarter of the right side among the players corresponding to the leafs of the bottommost layer in the hierarchical structure shown in FIG. 12 can use the encrypted part data of the content code 00001.svm.

In the manner described above, by encrypting the content code by using a group key Gn or a player specific key, it is possible to limit players that can decrypt and use the content code. The content code, as described above, contains security check code for security checking, and a conversion table used for converting content data, so that only specific players can be set so as to perform the security check process and the data conversion process.

Therefore, when a player information providing process is performed using an invalid player certificate as a result of a process such as copying the player certificate from another player, even if content code specific to the player corresponding to the player information is obtained and processing is performed, the content code cannot be decrypted using the group key contained in the encryption key set stored in the player. Thus, the content code specific to the player corresponding to the player information identified by an invalid player certificate is prevented from being illegally used.

Next, a different method for generating content code will be described with reference to FIG. 14. In step S211, each content code component generation entity encrypts a portion of the content code by using an original encryption key generated using a random number when the content code is generated. Thereafter, a request is made to the key management center so that the original encryption key used to encrypt the content code is encrypted using node keys (a group key [Gn] and a player specific key) described previously with reference to FIG. 12, that is, keys specific to a licensee/platform/model/version, and the like.

Each content code component generation entity sends content code encrypted using the original encryption key, the original encryption key, and the content code encryption configuration information 642 having the encryption configuration information of each content code to the key management center. The content code encryption configuration information 642, as shown in the figure, includes data of the correspondence among the content code number as content code identification information, encrypted segment information, and specification information of a key used for the encrypted segment.

In the key management center, encryption based on the content code encryption configuration information 642 is performed on the original encryption key received from each content code component generation entity. That is, the key management center obtains a key specified in the content code encryption configuration information 642 from the issued key database formed of key information in the hierarchical structure described with reference to FIG. 12(a), encrypts the original encryption key received from each content code component generation entity, and stores it in the content code.

Figure 14:
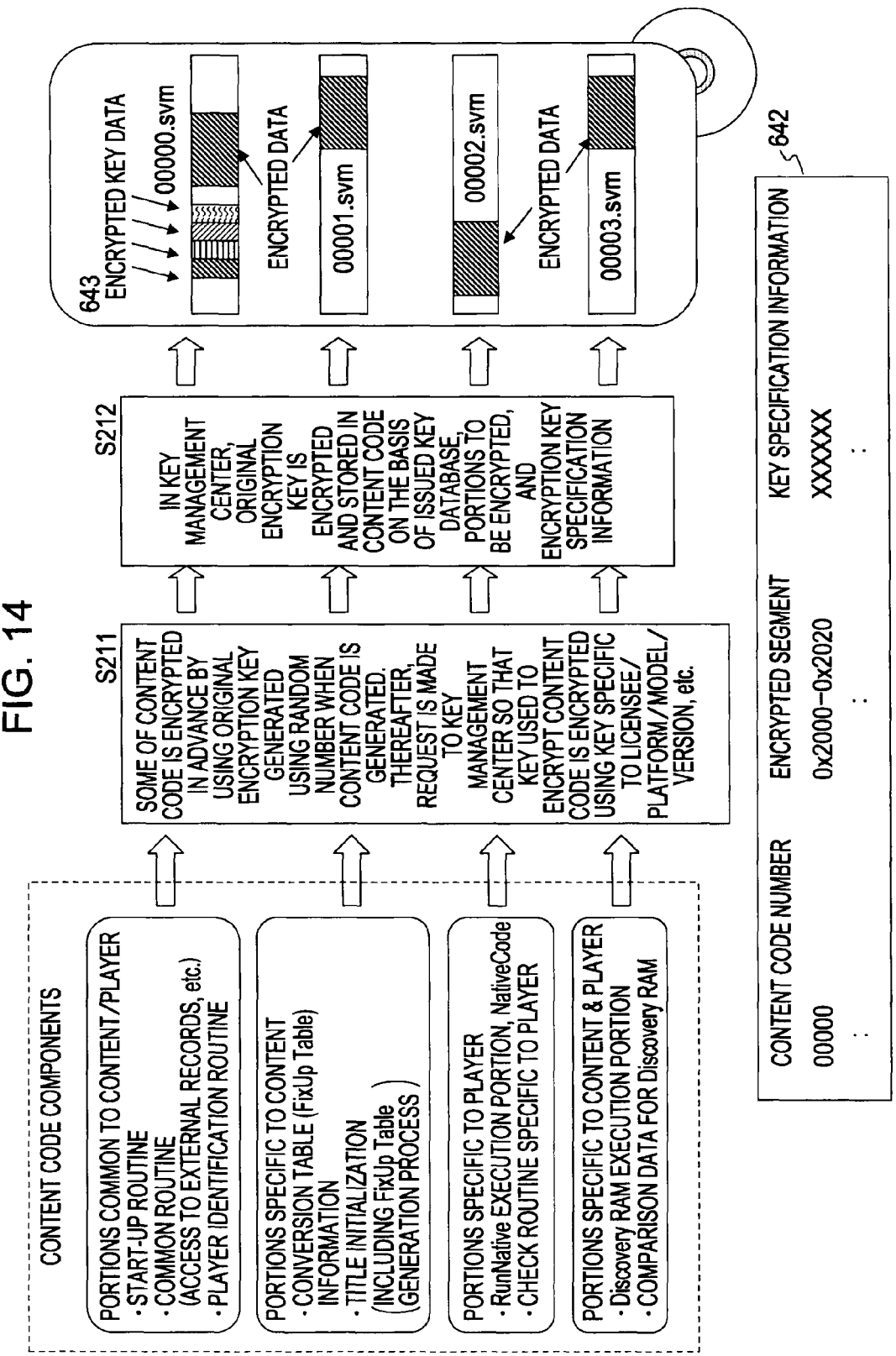
FIG. 14 illustrates processes for generating and encrypting content code to be stored on the information recording medium.

In the example shown in FIG. 14, encrypted key data 643 set in the content code file [00000.svm] is an area in which data such that the original encryption key is encrypted is stored. That is, each of a plurality of original encryption keys received from each content code component generation entity is encrypted using an encryption key selected on the basis of the content code encryption configuration information 642, that is, one of group keys [Gn] in the hierarchical structure described with reference to FIG. 12(a).

The encrypted data set in the content code files [00000.svm] to [00003.svm] is data encrypted using the original encryption key generated by each content code component generation entity.

For example, at the end of the encrypted key data 643 set in the content code file [00000.svm], encrypted data is stored such that an original encryption key (K03) used to encrypt encrypted data contained in the content code file 0003 is encrypted using the group key [Gn].

For example, if the original encryption key (K03) has been encrypted using the group key G1-631 shown in FIG. 12(a), only the players holding the group key G1-631 can decrypt the encrypted key and can obtain the original encryption key (K03). Thus, the players are only the players corresponding to the leafs on the right half among the players corresponding to the leafs of the bottommost layer in the hierarchical structure shown in FIG. 12.

As a result, among the players corresponding to the leafs of the bottommost layer in the hierarchical structure shown in FIG. 12, only the players corresponding to the leafs on the right half can obtain the original encryption key (K03) and can use the encrypted part data of the content code 00003.svm. Since the players corresponding to the leafs on the left half do not hold the group key G1-631, they cannot obtain the original encryption key (K03) and cannot use the encrypted part data of the content code 00003.svm. In this example of processing, the encryption process in the key management center is only the encryption of the original encryption key, and quick processing is possible. Furthermore, since the content code sent from each content code component generation entity to the key management center has already been encrypted using the original encryption key, the possibility of information being leaked can be reduced.

Next, a description will be given, with reference to FIG. 15, of processing of content code by a player. In data processing of the information processing apparatus for reproducing content, the secure VM obtains content code containing a data processing program recorded on an information recording medium, and performs data processing in accordance with the content code. At least a portion of the content code has been encrypted using a node key, as described with reference to FIGS. 13 and 14.

The secure VM obtains, from the data stored on the information recording medium, key specification information used to decrypt content code and encrypted data position specification information indicating the position of encrypted data set in the content code, selects a node key from the memory in accordance with the obtained information, specifies data to be decrypted in accordance with the encrypted data position specification information, and performs a decryption process using the selected node key.

Figure 15:
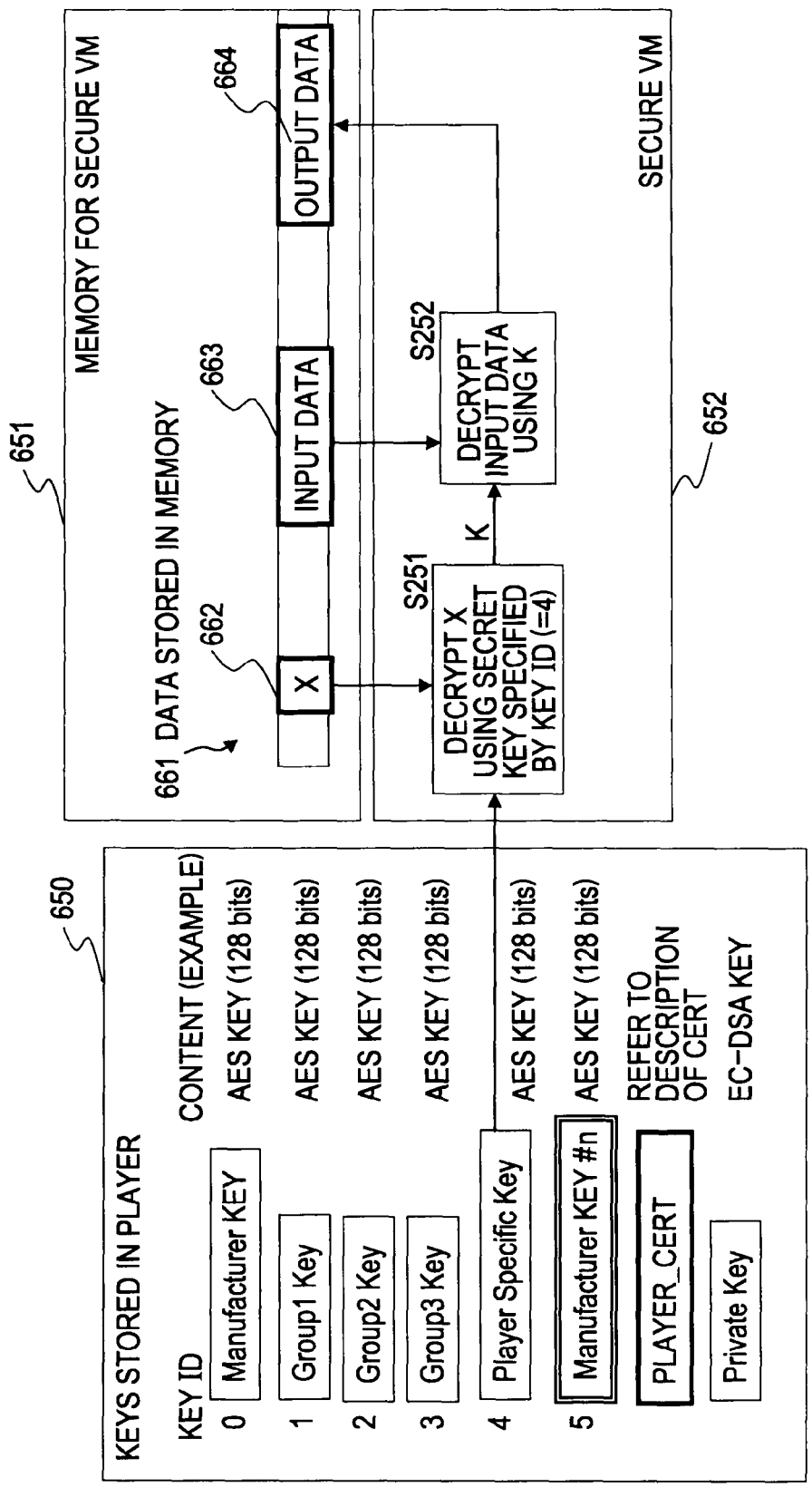
FIG. 15 illustrates a content-code use processing sequence in the information processing apparatus.

FIG. 15 illustrates processing of content code having the setting of FIG. 14 on the player side, and also illustrates processing by a secure VM 652 by using the keys 650 stored in the player described previously with reference to FIG. 12(c). The content code stored on the information recording medium is read by the secure VM 652, whereby it is processed. The secure VM 652 stores the content code read from the information recording medium in a memory for the secure VM 651 and performs processing thereon.

For the keys 650 stored in the player, keys described with reference to FIG. 12, that is, keys from a player manufacturing entity key (Manufacture key) to a player secret key (Private_Key) distributed by the key management center, a public key certificate, and the player manufacturing entity key (Manufacture key #n) distributed by the player manufacturing entity, are shown.

Initially, in step S251, the secure VM 652 obtains encrypted key data [X] 662 set in the content code to be processed from the data 661 stored in the memory for the secure VM 651, and selects, from the keys 650 stored in the player, a key used for a process for decrypting the encrypted key data [X] 662 on the basis of the key specification information obtained from the recorded data contained in the content code or from another data file. The key specification information is information recorded on the information recording medium on the basis of the content code encryption configuration information 642 described previously with reference to FIGS. 13 and 14.

In this example of processing, the key specification information is assumed as key ID=4, that is, as information that specifies a player specific key (Player_Specific_Key). On the basis of the key specification information [key ID=4], the secure VM 652 selects the player specific key (Player_Specific_Key) from the keys 650 stored in the player, and performs a process for decrypting the encrypted key data [X] 662.

As a result of performing this decryption process, an original encryption key [K] in which a portion of the content code is encrypted is obtained. In step S252, the secure VM 652 decrypts input data 663 corresponding to the encrypted part of the content code by using the obtained original encryption key [K], and stores the decrypted result as output data 664 in the memory for the secure VM 651. As a result of this processing, it becomes possible for the player to use, for example, content code specific to the player.

Such processing in the secure VM 652 is performed by a sequence of, for example, an interrupt (INTRP) process from the reproduction (player) application for performing a content reproduction process to the secure VM, and a response (Call) process from the secure VM to the reproduction (player) application. The process for decrypting the content code is performed by calling, for example, a function described below:

CALL_AES (output address, input data address, AES, number of process blocks, key address, key ID)

The above function is a function for enabling the following processes to be performed: a process for decrypting the value of 128 bits specified by the key address (encrypted key data [X] 662 in FIG. 15) by using a secret key possessed by the player specified by the key ID (ID=4 in FIG. 15) and a process for decrypting data for the number of AES process blocks*16 bytes from the input data address by using the decrypted result as a decryption key and for outputting the data after being decrypted to the output address.

Figure 16:
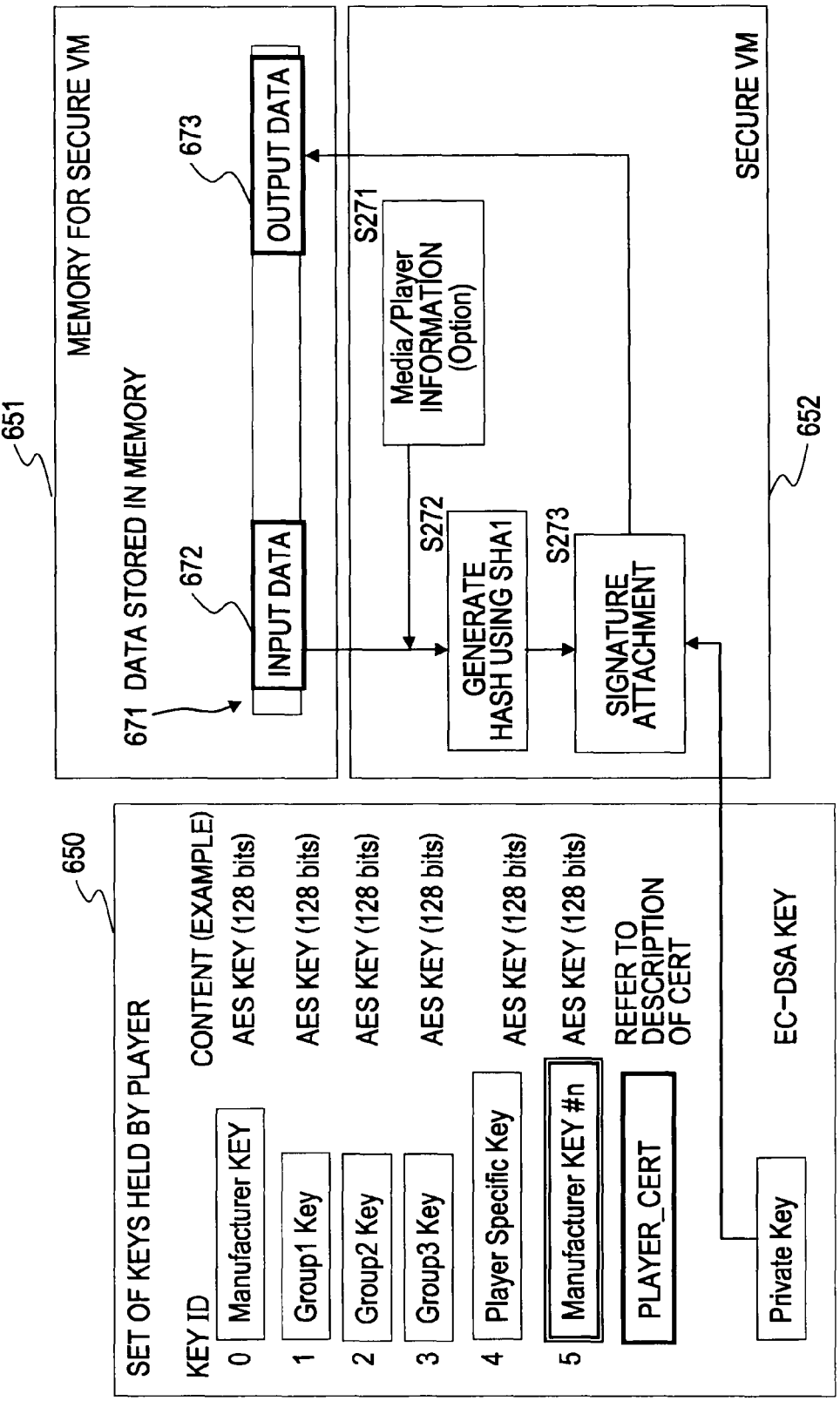
FIG. 16 illustrates a content-code use processing sequence in the information processing apparatus.

Furthermore, a description will be given, with reference to FIG. 16, of a different example of processing of content code by a player. FIG. 16 illustrates a signature process using a player secret key [Private_Key] within the keys 650 stored in the player.

In step S272, the secure VM 652 computes a hash value by using a hash function, such as, for example, SHA-1, with respect to input data 672 of data 671 stored in the memory for the secure VM 651. As a step prior to computing the hash value, in step S271, player information and media information may be added. Next, in step S273, a player secret key [Private_Key] is obtained on the basis of the keys 650 stored in the player, a digital signature for the hash value, for example, a digital signature based on an EC-DSA algorithm, is performed, and data containing the signature is stored as output data 673 in the memory for the secure VM 651. Thereafter, when executing the content code, the output data 673 is obtained and a signature verification process is performed, making it possible to verify the authenticity of the player.

The signature setting process is performed by calling, for example, a function described below by the secure VM 652.

CALL_PrivateKey (output address, input data address, length of data to be signed, option specification, key ID)

The above function is a function for enabling the following process to be performed: a process for fetching data for the length of data to be signed from the input data address, for converting option-specified media/player information added to a byte sequence into a hash value by a SHA1 function, for attaching a signature to the conversion result by using a secret key possessed by the player, and for writing it into the output address.

As has thus been described, by distributing a set of node keys set in each node in the hierarchical structure described previously with reference to FIG. 12(a) onto an information recording medium, by generating content code on which an encryption process in which a node key is selectively used has been performed, and by storing it on the information recording medium, it is possible to provide content code that can be processed by only a specific selected player.

Figure 17:
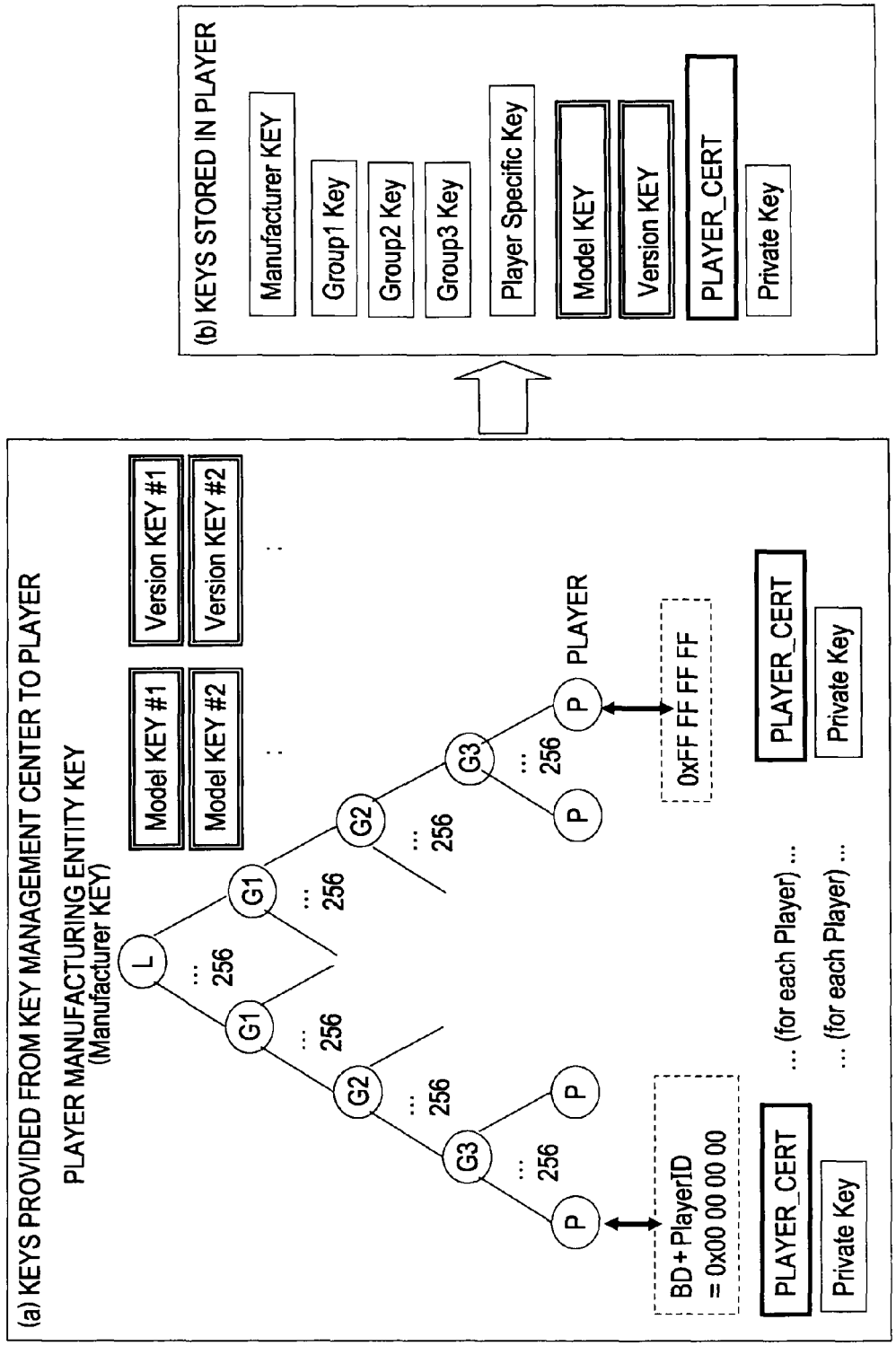
FIG. 17 illustrates an example of setting encryption keys to be distributed to players.

In addition to the configuration described previously with reference to FIG. 12, the configuration of the distribution of keys to the player can be set variously. Examples thereof will now be described with reference to FIGS. 17 and 18. The hierarchical structure of the example shown in FIG. 17 is the same configuration as that described previously with reference to FIG. 12(a). Each player holds a key corresponding to each node in the route from one node (leaf) of the bottommost layer corresponding to its own player up to the apex node in the hierarchical structure. That is, as shown in FIG. 17(b), keys from a player manufacturing entity key (Manufacture key) to a player unique key (Player_Specific_Key), a player secret key (Private_Key), and a player public key certificate (PLAYER_CERT) are distributed from the key management center.

In the example shown in FIG. 17, furthermore, on the basis of each of these keys, the key management center sets a model key [Model key #n] and a version key [Version #n], selects keys corresponding to the model and the version corresponding to the player and provides them to the player.

Figure 18:
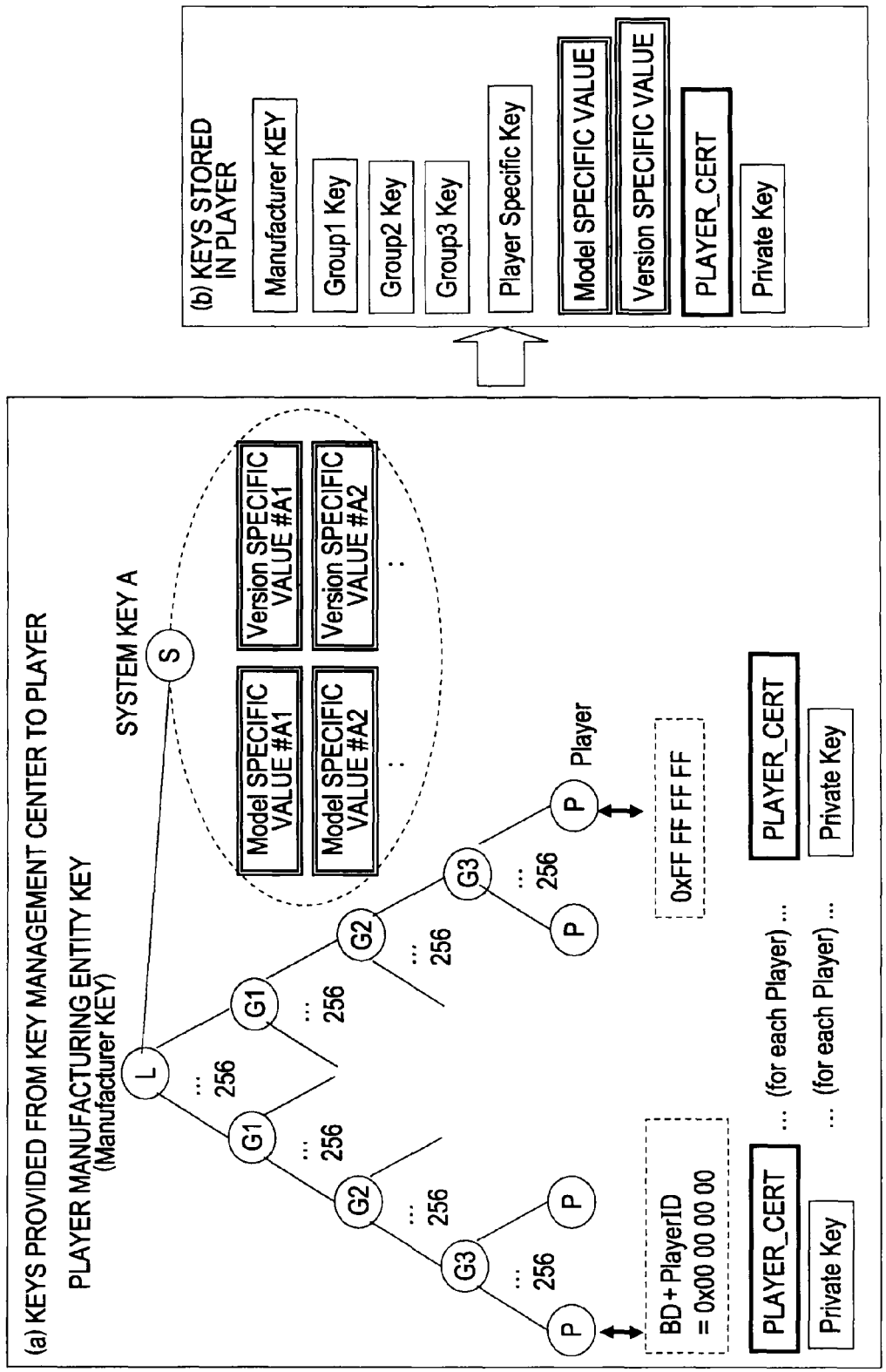
FIG. 18 illustrates an example of setting encryption keys to be distributed to players.

The hierarchical structure of the example shown in FIG. 18 has the same structure as that described previously with reference to FIG. 12(a). Each player holds a key corresponding to each node in the route from one node (leaf) of the bottommost layer corresponding to its own player up to the apex node in the hierarchical structure. That is, as shown in FIG. 17(b), keys from a player manufacturing entity key (Manufacture key) to a player specific key (Player_Specific_Key), the player secret key (Private_Key), and a player public key certificate (PLAYER_CERT) are distributed from the key management center.

In the example shown in FIG. 18, furthermore, the key management center sets a model specific value [Model specific value #An] and a version specific value [Version specific value #An] as system keys [A], selects specific values corresponding to the model and the version corresponding to the player on the basis of the specific values, and provides them to the player.

A plurality of system keys can be defined and, for example, the system keys can be used separately among greatly different systems, such as a CE device as a play-only device and a PC. The model specific value [Model specific value #An] and the version specific value [Version specific value #An] are set so as to be held in a state in which they are encrypted by the player using the system key, so that they can be used as keys specific to the model and the version by decrypting them using the system key. As a result of being set in this manner, for example, in the case of a secure system as a model (platform), it is possible to use the same content code for the entire model regardless of the version, whereas when one version among the models is vulnerable, it is also possible to use the content code for only a particular version of the model.

In both FIGS. 17 and 18, for the processing configuration using a node key in the hierarchical structure, processing identical to the processing described previously with reference to FIGS. 12 to 16 is possible. It is possible to select a specific player, to set content code that can be used in the selected player, to store it on the information recording medium, and to provide it. Thus, it is possible to prevent an illegal process in which invalid player information is provided and content code is illegally used.

Figure 19:
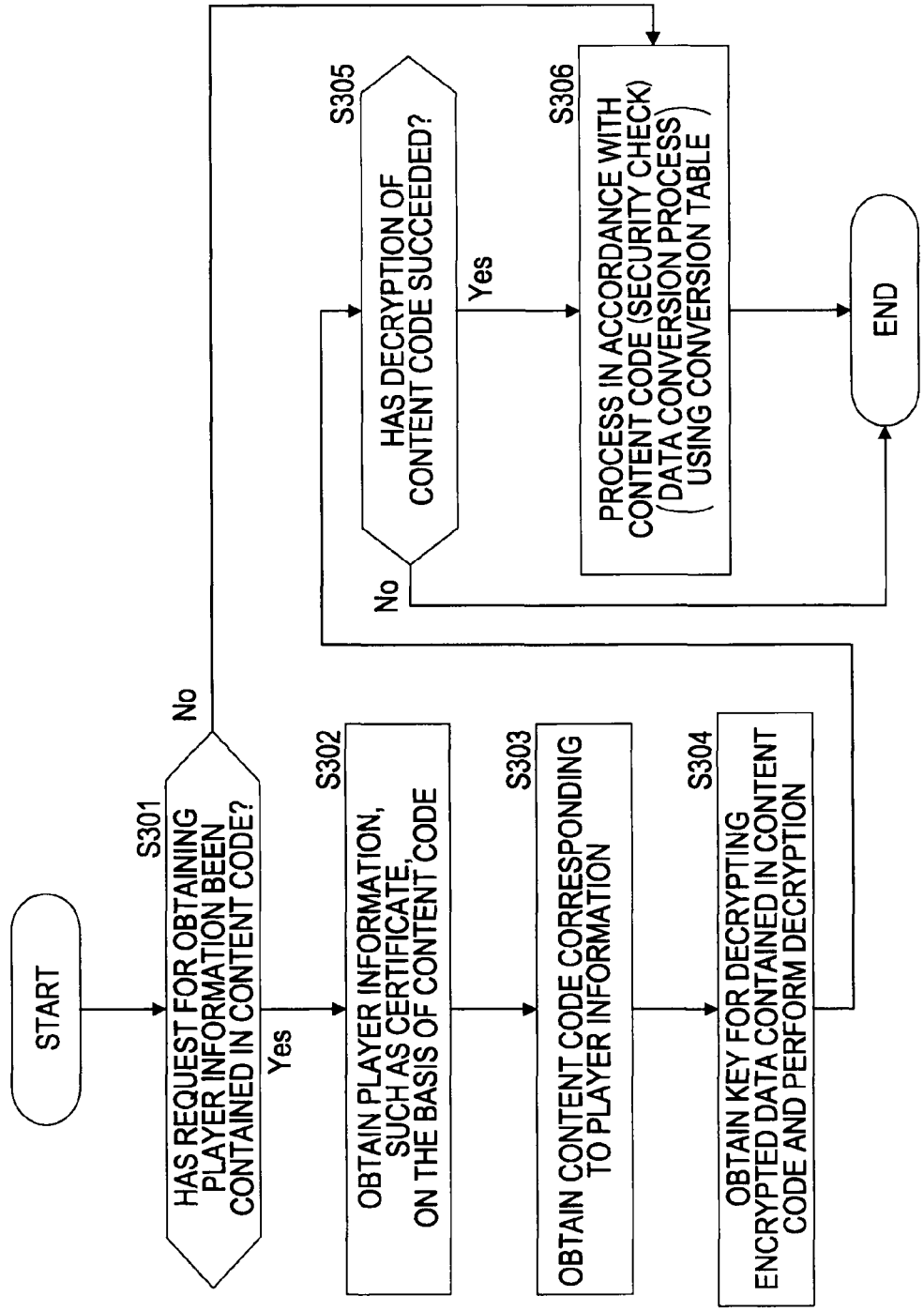
FIG. 19 shows a flowchart illustrating the execution sequence of processing involved with content reproduction in the information processing apparatus.

Next, a description will be given, with reference to the flowchart in FIG. 19, of a content reproduction sequence involving a security check process using security check code within content code and a conversion process using a conversion table.

Initially, in step S301, the secure VM obtains content code from an information recording medium and determines whether or not a request for obtaining player information is contained in the content code. For example, in the case of the directory setting shown in FIG. 9, this determination is performed by reading the content code file [00000.svm] in which code used to determine player information is stored.

When the request for obtaining player information has not been contained in the content code, the process proceeds to step S306. When the request for obtaining player information has been contained in the content code, the process proceeds to step S302, where player information necessary for a security check is obtained in accordance with the content code. These pieces of information include, for example, the player certificate described with reference to FIG. 11.

Next, in step S303, content code corresponding to the player is obtained. In step S304, a key for decrypting the encrypted data contained in the content code is obtained, and decryption is performed. There are various processing modes. For example, in the setting of content code described with reference to FIG. 13, the secure VM obtains a specification node key (group key) from the encryption key set stored in the memory in the information processing apparatus, and decrypts the encrypted data of the content code. In the case of setting content code shown in FIG. 14, as described previously with reference to FIG. 15, a specification node key (group key) is obtained from the encryption key set stored in the memory in the information processing apparatus, and the encrypted data of the original encryption key contained in the content code is decrypted to obtain the original encryption key. Thereafter, by using the obtained original encryption key, the encrypted data contained in the content code is decrypted. The key specification information and the position information of the encrypted data are obtained from the content code or from another data file.

In step S305, it is determined whether or not the decryption of the content code has succeeded. When it has failed, the processing is stopped and completed. This case means that a correct key corresponding to the player corresponding to the content code has not been used. In this case, a process using content code, for example, a security check process or a process for converting content data on the basis of a conversion table, is not performed. As a result, use of content is prohibited.

When it is determined in step S305 that the decryption of the content has succeeded, the process proceeds to step S306, where a process using the content code is performed. That is, a security check process or a process for converting content data based on a conversion table is performed, and the content is used.

The process to be performed by the secure VM differs according to the content code to be processed. For example, when the content code is security check code, a security check process is performed on the basis of the content code. When the content code is data generation process code used for a process for converting data constituting content stored on the information recording medium, data to be used for a process for converting data constituting content stored on the information recording medium on the basis of the content code is generated. Furthermore, when the content code is data generation process code applied in a data conversion process for embedding identification information corresponding to the information processing apparatus or the content using application into a portion of the data constituting content stored on the information recording medium, data used for a data conversion process for embedding identification information is generated on the basis of the content code.

[7. Configuration of Information Processing Apparatus]

Figure 20:
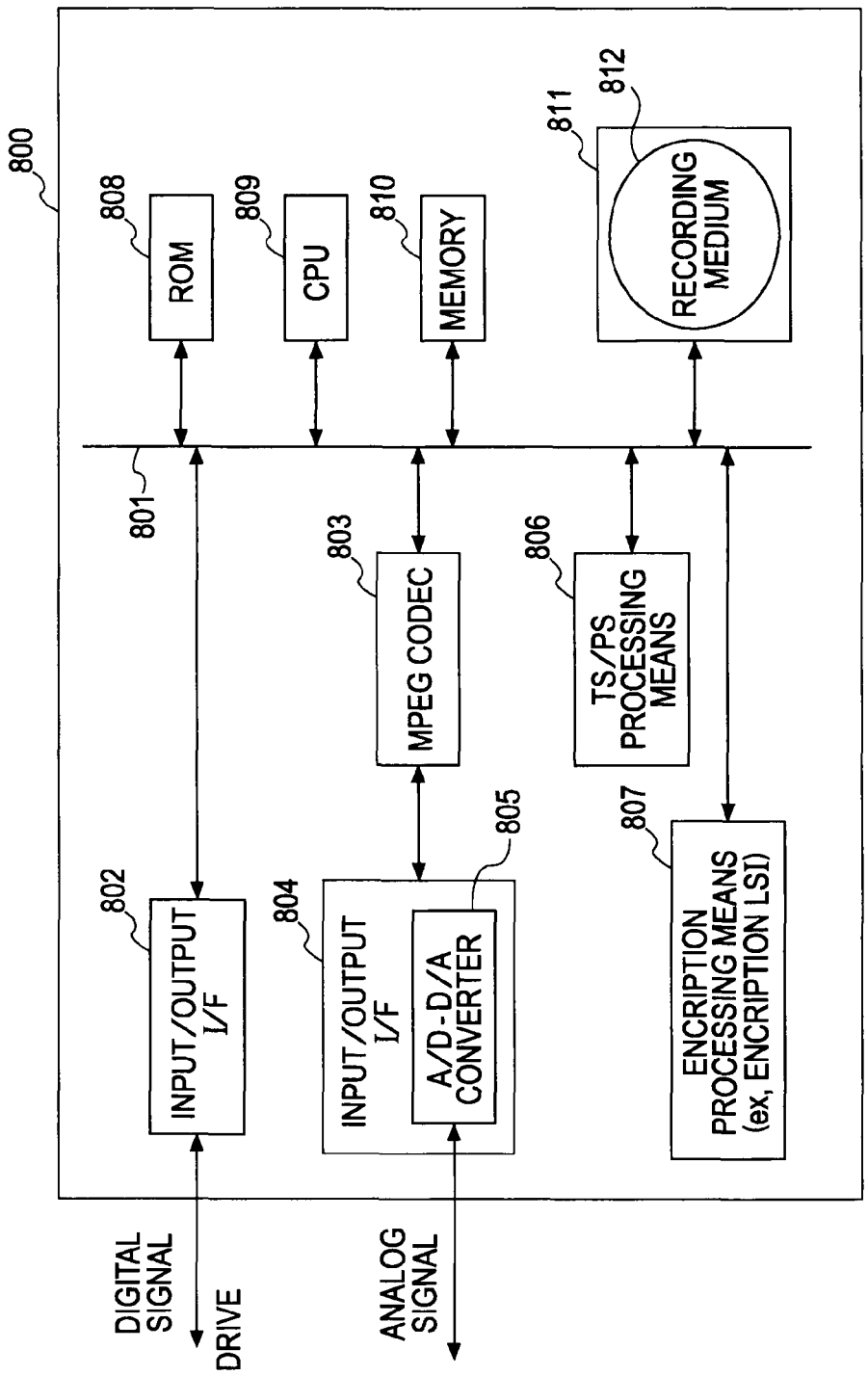
FIG. 20 illustrates an example of the hardware configuration of the information processing apparatus.

Next, a description will be given, with reference to FIG. 20, of an example of the hardware configuration of an information processing apparatus for performing the above-described reproduction (player) application and data processing using a secure VM. An information processing apparatus 800 includes a CPU 809 for performing data processing in accordance with various kinds of programs for various processes involved in the OS, a content reproduction or recording application program, a mutual authentication process, and content reproduction, for example, a security check process based on the security check code, and the like, a data conversion process using a conversion table, a ROM 808 serving as an area for storing the programs, parameters, and the like, a memory 810, an input/output I/F 802 for inputting and outputting a digital signal, an input/output I/F 804 for inputting and outputting an analog signal, the input/output I/F 804 having an A/D-D/A converter 805, an MPEG codec 803 for encoding and decoding MPEG data, TS and PS processing means 806 for performing TS (Transport Stream) and PS (Program Stream) processes, encryption processing means 807 for performing various kinds of encryption processes such as mutual authentication and an encrypted content decryption process, a recording medium 812 such as a hard disk, and a drive 811 for driving the information recording medium 812 and for inputting and outputting a data recording/reproduction signal. Each block is connected to a bus 801.

The information processing apparatus (host) 800 is connected to the drive via, for example, a connection bus, such as an ATAPI-BUS. The conversion table, content, and the like are input and output via the input/output I/F 802 for a digital signal. The encryption process and the decryption process are performed by the encryption processing means 807 by using, for example, an AES algorithm.

A program for performing a content reproduction or recording process has been stored in, for example, the ROM 808. While the program is being executed, the memory 810 is used as a work area for storing parameters and data as necessary.

In the ROM 808 or the recording medium 812, for example, the following are stored: the above-described player certificate, the public key of the management center, which is used for verifying the signature of the player certificate, a secret key corresponding to the host, which is used for an authentication process with the drive, a public key certificate corresponding to the host, a revocation list as a nullified list of the public key certificate, and the like.

When reproducing content or outputting content to the outside, processing in accordance with the processing sequence described earlier is performed by using a data conversion processing program obtained from the information recording medium, examples of the processing being processes for decrypting encrypted content, restoring the conversion table, and writing conversion data on the basis of the data stored in the conversion table.

[8. Information Recording Medium Manufacturing Apparatus and Information Recording Medium]

Next, a description will be given of an information recording medium manufacturing apparatus and an information recording medium. That is, an apparatus and method for manufacturing an information recording medium, which are applied in the above-described content reproduction process, and an information recording medium will be described.

The information recording medium manufacturing apparatus is an apparatus for manufacturing, for example, the information recording medium 100 on which the recording data described previously with reference to FIG. 1 is stored. On the information recording medium 100, content code containing security check code and a conversion table is stored. The content code, as described with reference to FIGS. 13 and 14, is content code partially containing data that is encrypted using an original encryption key generated using various node keys, random numbers, or the like.

The information recording medium manufacturing apparatus, as shown in FIG. 21, includes content file generation means 901 for generating a content file having stored therein content data to be recorded on the information recording medium, content code file generation means 902 for generating a content code file having stored therein content code containing a program for a security check process to be performed when using the content, and recording means 903 for recording a content file generated by the content file generation means 901 and a content code file generated by the content code file generation means 902 on the information recording medium 910.

The content code file generation means 902, as described previously with reference to FIG. 9, is configured to perform a process for generating a plurality of content code files corresponding to the type of information processing apparatus or content using application. The content code to be stored in the content code file, as described previously with reference to FIGS. 13 and 14, is content code partially containing data that is encrypted using an original encryption key generated using various node keys or random numbers.

The content code file generation means 902 generates a content code file having stored therein content code containing encrypted data that is encrypted using a node key corresponding to one of nodes in a key tree having a hierarchical structure in which each information processing apparatus or each reproduction application is associated with a leaf that is the bottommost layer node. Specific examples of the content code encryption mode includes a mode described previously with reference to FIGS. 13 and 14. That is, the content code file generation means 902 generates a content code file having stored therein content code containing code information encrypted data such that data constituting content code is directly encrypted using a node key, or generates a content code file having stored therein content code containing code information encrypted data such that data constituting content code is encrypted using a unique encryption key (original encryption key) differing from the node key and encrypted key data such that the unique encryption key is encrypted using the node key.

The content code file generation means 902 is configured to generate a content code file having stored therein content code containing at least one of security check code corresponding to the information processing apparatus and data generation process code used for a process for converting data constituting content stored on an information recording medium. Furthermore, the content code file generation means 902 is configured to generate a content code file having stored therein content code containing data generation process code used for a data conversion process for embedding identification information corresponding to the information processing apparatus or the content using application into a portion of the data constituting content stored on the information recording medium.

On the information recording medium 910 created by such an information recording medium manufacturing apparatus, various kinds of data described with reference to FIG. 1 and other figures are recorded. More specifically, the information recording medium 910 is configured to contain a content file having stored therein content data, and a content code file having stored therein content code containing at least one of a program for a security check process to be performed when using the content and data generation process code used for a process for converting data constituting the content stored on the information recording medium.

The content code file to be recorded on the information recording medium 910 contains encrypted data such that data constituting content code is encrypted. Specific examples of content code encryption modes include a mode described previously with reference to FIGS. 13 and 14. That is, the following are stored: a content code file having stored therein content code containing code information encrypted data such that data constituting content code is directly encrypted using a node key, a content code file having stored therein content code containing code information encrypted data such that data constituting content code is encrypted using a unique encryption key (original encryption key) differing from the node key and encrypted key data such that a unique encryption key is encrypted using a node key, and the like.

The content code file recorded on the information recording medium 910 is a content code file having stored therein content code containing at least one of security check code corresponding to the information processing apparatus and data generation process code used for a process for converting data constituting the content stored on the information recording medium, and further includes a content code file having stored therein content code containing data generation process code used for a data conversion process for embedding identification information corresponding to the content using application into a portion of the data constituting the content stored on the information recording medium.

In the foregoing, the present invention has been described in detail while referring to specific embodiments. However, it is self-explanatory that a person skilled in the art can make modifications and substitutions of the embodiments within the scope and spirit of the present invention. That is, the present invention has been described in the form of examples and should not be construed as being limited. To determine the gist of the present invention, the claims should be taken into consideration.

The series of processes described in the specification can be performed by hardware, software, or the combined configuration of them. When the series of processes is to be performed by software, a program in which a processing sequence is recorded is installed in a memory of a computer that is incorporated in specialized hardware, whereby the program can be executed, or a program is installed into a general-purpose computer capable of performing various processes, whereby the program can be executed.

For example, a program can be recorded in advance in a hard disk and a ROM (Read Only Memory) serving as recording media. Alternatively, a program can be temporarily or permanently stored (recorded) on a removable recording medium, such as a flexible disk, a CD-ROM (Compact Disc Read Only Memory), an MO (Magneto optical) disc, a DVD (Digital Versatile Disc), a magnetic disc, or a semiconductor memory. Such a removable recording medium can be provided as packaged software.

In addition to being installed into a computer from the above-described removable recording medium, the program may be transferred wirelessly from a download site or may be transferred by wire to a computer via a network, such as a LAN (Local Area Network) or the Internet. It is possible for the computer to receive the program that is transferred in such a manner and to install the program into a recording medium such as a hard disk contained therein.

The various processes described in the specification may be executed not only in chronological order according to the description, and may also be executed in parallel or individually according to the processing performance of the apparatus that performs processing or as necessary. In this specification, the system designates a logical assembly of a plurality of devices. It is not essential that the devices be disposed in the same housing.

INDUSTRIAL APPLICABILITY

As has thus been described, according to the configuration of an embodiment of the present invention, in a configuration in which content code containing a data processing program recorded on an information recording medium is obtained and data processing, such as a security check process in accordance with the content code, a process for converting data constituting content, and a process for embedding player information into content, is performed, at least a portion of the content code is set as encrypted data, and as an encryption key therefor, a node key set so as to correspond to a node of a key tree having a hierarchical structure is used. It is possible to specify in advance a player capable of decrypting an encrypted part of the content code by using the node key, and it is possible to process only appropriate content code compliant with each player. Therefore, a configuration in which a process for using invalid content code is prevented is implemented.

What is claimed is:

1. An information processing apparatus comprising:
   a processor that obtains content code containing a data processing program recorded on an information recording medium, stores the content code in a first memory, and performs data processing in accordance with the content code; and
   a second memory that stores a public key and a secret key, wherein
   the public key and the secret key are set so as to correspond to a content player executed on the information processing apparatus, and
   the processor generates a digital signature based on first data constituting at least a portion of the content code using the secret key obtained from the second memory, and performs data processing in accordance with a result of a verification process which verifies the digital signature using the public key.

2. The information processing apparatus of claim 1, wherein
   the processor generates the digital signature based on a hash value that is computed based on the first data.

3. The information processing apparatus of claim 2, wherein
   the processor computes the hash value based on the first data and content player information or media information.

4. The information processing apparatus of claim 1, wherein the processor:
   obtains a content player certificate including the public key from the second memory;
   performs an authenticity verification process for the content player certificate;
   obtains identification information corresponding to the information processing apparatus or the content player included in the content player certificate when authenticity for the content player certificate is confirmed; and
   selects a content code to be processed based on the obtained information.

5. The information processing apparatus of claim 1, wherein
   the content code includes a data generation process code used to convert content data stored on the information recording medium, and
   the processor generates data used to convert the content data stored on the information recording medium based on the result of the verification process.

6. An information processing method performed by an information processing apparatus, the method comprising:
   obtaining content code containing a data processing program recorded on an information recording medium;
   generating a digital signature based on data constituting at least a portion of the content code using a secret key obtained from a memory of the information processing apparatus;
   verifying the digital signature using a public key obtained from the memory of the information processing apparatus; and
   performing data processing in accordance with the content code based on a result of the verifying, wherein
   the public key and the secret key are set so as to correspond to a content player executed on the information processing apparatus.

7. A non-transitory computer-readable medium including a computer program, which when executed by an information processing apparatus, causes the information processing apparatus to perform an information processing method comprising:
   obtaining content code containing a data processing program recorded on an information recording medium;
   generating a digital signature based on data constituting at least a portion of the content code using a secret key obtained from a memory of the information processing apparatus;
   verifying the digital signature using a public key obtained from the memory of the information processing apparatus; and
   performing data processing in accordance with the content code based on a result of the verifying, wherein the public key and the secret key are set so as to correspond to a content player executed on the information processing apparatus.

\* \* \* \* \*